US011637744B2

(12) United States Patent
Moulik et al.

(10) Patent No.: US 11,637,744 B2
(45) Date of Patent: Apr. 25, 2023

(54) METHODS AND SYSTEMS FOR MANAGING HEALTH OF DEVICES IN AN IOT ENVIRONMENT USING INTER-DEVICE CORRELATION

(71) Applicant: Samsung Electronics Co., Ltd., Suwon-si (KR)

(72) Inventors: Sreedeep Moulik, Bangalore (IN); Sarthak Goel, Bangalore (IN); Raunaq Biswas, Bangalore (IN); Anand Sudhakar Chiddarwar, Bangalore (IN); Aneri Jaysinh Udeshi, Bangalore (IN); Inbarajan P, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/445,111

(22) Filed: Aug. 16, 2021

(65) Prior Publication Data

US 2022/0158894 A1 May 19, 2022

(30) Foreign Application Priority Data

Nov. 19, 2020 (IN) .............................. 202041050444

(51) Int. Cl.
*H04L 41/0677* (2022.01)
*H04L 41/0631* (2022.01)
*G06N 5/022* (2023.01)
*G16Y 30/00* (2020.01)

(52) U.S. Cl.
CPC ......... *H04L 41/0677* (2013.01); *G06N 5/022* (2013.01); *H04L 41/065* (2013.01); *H04L 41/0645* (2013.01); *G16Y 30/00* (2020.01)

(58) Field of Classification Search
None
See application file for complete search history.

(56) References Cited

U.S. PATENT DOCUMENTS 9,961,571 B2 * 5/2018 Yang ..................... H04W 24/04
10,652,154 B1   5/2020 Matthews et al.
(Continued)

FOREIGN PATENT DOCUMENTS

KR   10-2016-0010785 A   1/2016
KR   10-2018-0029800 A   3/2018
(Continued)

OTHER PUBLICATIONS

Examination report dated Jun. 21, 2022, in connection with Indian Application No. 202041050444, 6 pages.
(Continued)

*Primary Examiner* — Angela Nguyen

(57) ABSTRACT

Methods and systems for managing health of devices in an Internet of Things (IoT) environment. A method includes detecting an occurrence of at least one event on a device of a plurality of devices and determining a change in ambience in the device. The method also includes detecting at least one anomaly in the device if the determined change in the ambience of the at least one device does not satisfy threshold criteria determined for the at least one event. The method further includes determining at least one root cause for the at least one anomaly detected in the device.

20 Claims, 24 Drawing Sheets

(56) References Cited

U.S. PATENT DOCUMENTS

| | | | |
|---|---|---|---|
| 2015/0341379 A1* | 11/2015 | Lefebvre | H04L 63/1425 726/22 |
| 2016/0055422 A1 | 2/2016 | Li | |
| 2016/0261465 A1 | 9/2016 | Gupta et al. | |
| 2017/0205791 A1 | 7/2017 | Yang et al. | |
| 2017/0269983 A1 | 9/2017 | Liu et al. | |
| 2019/0297401 A1 | 9/2019 | Kim et al. | |
| 2019/0392328 A1 | 12/2019 | Gil Bulacio et al. | |
| 2020/0120122 A1 | 4/2020 | Du et al. | |
| 2021/0160961 A1* | 5/2021 | DeLuca | G06F 16/903 |

FOREIGN PATENT DOCUMENTS

| | | |
|---|---|---|
| KR | 10-2018-0071932 A | 6/2018 |
| KR | 10-2020-0063354 A | 6/2020 |

OTHER PUBLICATIONS

International Search Report and Written Opinion of the International Searching Authority dated Feb. 17, 2022, in connection with International Application No. PCT/KR2021/016221, 7 pages.

\* cited by examiner

| | AC Curr Temp | AC Target Temp | AC Mode | FAN Speed | AC elapsed time | Indoor Temp | Outdoor Temp | CO2 | Dust_PM |
|---|---|---|---|---|---|---|---|---|---|
| 0 | 28 | 25 | N | SLOW | 5 | 27 | 25 | 2.5 | 500 |
| 1 | 32 | 26 | FAN | MID | 6 | 30 | 26 | 2.5 | 550 |
| 2 | 32 | 28 | BOOST | MID | 8 | 28 | 36 | 3.5 | 700 |
| 3 | 24 | 18 | N | FAST | 8 | 21 | 30 | 3.4 | 700 |
| 4 | 24 | 23 | COOL | SLOW | 15 | 24 | 28 | 2.0 | 200 |
| 5 | 22 | 17 | FAN | FAST | 5 | 20 | 24 | 2.0 | 200 |
| 6 | 28 | 16 | BOOST | SLOW | 10 | 16 | 22 | 1.1 | 100 |
| 7 | 28 | 17 | BOOST | FAST | 10 | 19 | 22 | 1.1 | 100 |
| 8 | 27 | 17 | BOOST | FAST | 10 | 25 | 40 | 4.5 | 50 |
| 9 | 22 | 20 | COOL | MID | 3 | 22 | 24 | 1.0 | 200 |

| | AC Curr Temp | AC Target Temp | AC elapsed time | Indoor Temp | Outdoor Temp | CO2 | Dust_PM |
|---|---|---|---|---|---|---|---|
| AC Curr Temp | 1.000000 | 0.564536 | 0.087804 | 0.530496 | 0.220962 | 0.275451 | 0.386211 |
| AC Target Temp | 0.564536 | 1.000000 | -0.123270 | 0.861332 | 0.195268 | 0.236077 | 0.673329 |
| AC elapsed time | 0.087804 | -0.123270 | 1.000000 | -0.167974 | 0.244988 | 0.107074 | -0.289113 |
| Indoor Temp | 0.530496 | 0.861332 | -0.167974 | 1.000000 | 0.480078 | 0.549600 | 0.564142 |
| Outdoor Temp | 0.220962 | 0.195268 | 0.244988 | 0.480078 | 1.000000 | 0.920776 | 0.208423 |
| CO2 | 0.275451 | 0.236077 | 0.107074 | 0.549600 | 0.920776 | 1.000000 | 0.414463 |
| Dust_PM | 0.386211 | 0.673329 | -0.289113 | 0.564142 | 0.208423 | 0.414463 | 1.000000 |

METHODS AND SYSTEMS FOR MANAGING HEALTH OF DEVICES IN AN IOT ENVIRONMENT USING INTER-DEVICE CORRELATION

CROSS-REFERENCE TO RELATED APPLICATION

This application is based on and claims priority under 35 U.S.C. 119 to Indian Patent Application No. 202041050444, filed on Nov. 19, 2020, in the Indian Intellectual Property Office, the disclosure of which is herein incorporated by reference in its entirety.

BACKGROUND

1. Field

The present disclosure relates to the field of an Internet of Things (IoT) environment and more particularly to managing health of devices in the IoT environment based on at least one correlation between the devices.

2. Description of Related Art

In general, an Internet of Things (IoT) environment includes a plurality of devices with which users may interact. Health of each of the devices has to be checked for detecting a change in behavior of the device or any anomalies in the devices.

In conventional methods, a cloud may remotely access information (for example; functional information, state information, or the like) of the devices present in the IoT environment. The cloud may initiate health check on the device(s) to detect the anomalies in the device, on receiving a request from the user for the corresponding device. Thus, in the conventional methods, the user has to manually check the health of the device, due to which the user may forget to check the health of the devices frequently.

Further, the cloud may determine the health of the device based on the information received from the corresponding single device. However, the other devices present in the IoT environment may impact the health of the device.

In addition, the cloud may provide information about the health of the device in a form of visual representations. However, the representations may not be intuitive and full of technical jargons. Thus, the user/layman may not understand the representation corresponding to the health of the device.

SUMMARY

The principal object of the embodiments herein is to disclose methods and systems for managing health of devices in an Internet of Things (IoT) environment based on inter-device correlation.

Another object of the embodiments herein is to disclose methods and systems for determining the correlation between one or more events of the at least one device and a change in ambience of the at least one device in the IoT environment, wherein the change in ambience refers to a change in events of co-used devices associated with the at least one device, due to the one or more events of the at least one device.

Another object of the embodiments herein is to disclose methods and systems for detecting one or more anomalies in the at least one device based on the determined correlation between the one or more events of the at least one device and the change in ambience.

Another object of the embodiments herein is to disclose methods and systems for determining one or more root causes for the one or more anomalies detected in the at least one device.

Another object of the embodiments herein is to disclose methods and systems for deriving one or more remedies for resolving the one or more anomalies detected in the at least one device and one or more emotions for depicting the one or more root causes determined for the one or more anomalies.

Accordingly, the embodiments herein provide methods and systems for managing health of devices in an Internet of Things (IoT) environment. A method disclosed herein includes detecting an occurrence of at least one event on at least one device of the plurality of devices. The method further includes determining a change in an ambience of the at least one device corresponding to the occurrence of the at least one event on the at least one device, using at least one ambient sensor present in the IoT environment. The method further includes detecting at least one anomaly in the at least one device, if the determined change in the ambience of the at least one device does not satisfy threshold criteria determined for the detected at least one event. The method further includes determining at least one root cause for the detected at least one anomaly in the at least one device.

Accordingly, embodiments herein provide an electronic device in an Internet of Things (IoT) environment comprising a memory and a processor coupled to the memory. The processor is configured to detect an occurrence of at least one event on at least one device of the plurality of devices. The processor is further configured to determine a change in an ambience of the at least one device corresponding to the occurrence of the at least one event on the at least one device, using at least one ambient sensor present in the IoT environment. The processor is further configured to detect at least one anomaly in the at least one device, if the determined change in the ambience of the at least one device does not satisfy threshold criteria determined for the detected at least one event. The processor is further configured to determine at least one root cause for the detected at least one anomaly in the at least one device.

These and other aspects of the example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the example embodiments herein without departing from the spirit thereof, and the example embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

Embodiments herein are illustrated in the accompanying drawings, throughout which like reference letters indicate corresponding parts in the various figures. The embodiments herein will be better understood from the following description with reference to the drawings, in which.

DETAILED DESCRIPTION

Figure 1:
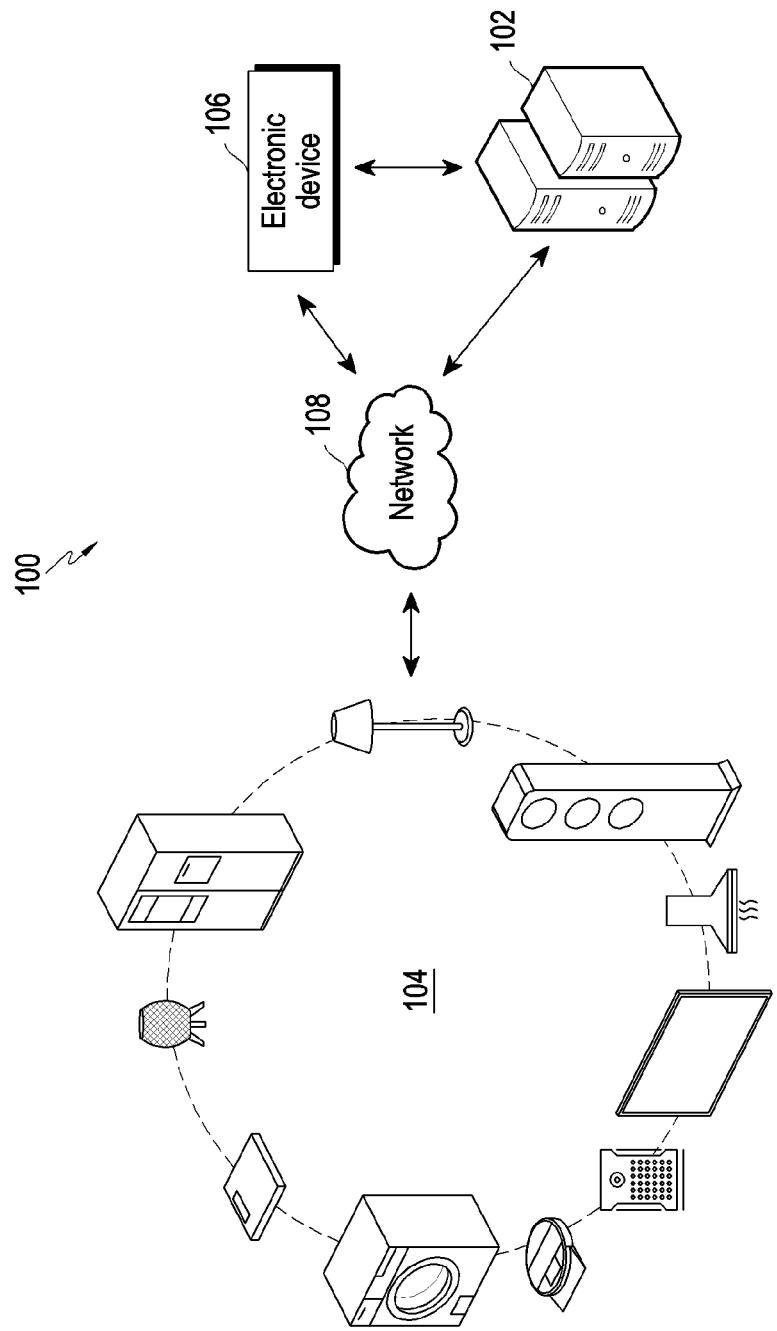
FIG. 1 illustrates an Internet of Things (IoT) system, according to embodiments as disclosed herein.

FIGS. 1 through 14F, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The description herein is intended merely to facilitate an understanding of ways in which the example embodiments herein can be practiced and to further enable those of skill in the art to practice the example embodiments herein. Accordingly, this disclosure should not be construed as limiting the scope of the example embodiments herein.

Embodiments herein disclose methods and systems for managing health of devices in an Internet of Things (IoT) environment using based on a correlation between the devices.

Referring now to the drawings, and more particularly to FIGS. 1 through 14F, where similar reference characters denote corresponding features consistently throughout the figures, there are shown example embodiments.

FIG. 1 illustrates an Internet of Things (IoT) system 100, according to embodiments as disclosed herein. The IoT system 100 includes an IoT cloud server 102, a plurality of devices 104, and an electronic device 106.

The IoT cloud server 102, the plurality of devices 104, and the electronic device 106 may be connected with each other. In an example, the IoT cloud server 102, the plurality of devices 104 and the electronic device 106 may be connected with each other using a communication network 108. The communication network 108 may include at least one of, but is not limited to, a wired network, a value added network, a wireless network, a satellite network or a combination thereof. Examples of the wired network may be, but are not limited to, a Local Area Network (LAN), a Wide Area Network (WAN), an Ethernet, and so on. Examples of the wireless network may be, but are not limited to, a cellular network, a wireless LAN (Wi-Fi), Bluetooth, Bluetooth low energy, Zigbee, Wi-Fi Direct (WFD), Ultra-wideband (UWB), infrared data association (IrDA), near field communication (NFC). In another example, the electronic device 106, and the plurality of devices 104 may be connected with each other directly (for example: via a direct communication, via an access point, and so on). In another example, the electronic device 106 and the plurality of devices 104 may be connected to the IoT cloud server 102 and the electronic device 106 may be connected to the plurality of devices 104 through the IoT cloud server 102. In another example, the electronic device 106 may be connected to the plurality of devices 104 using the communication network 108 and the electronic device 106 and the plurality of devices 104 may be connected to the IoT cloud server 102 using the communication network 108. In another example, the electronic device 106, the plurality of devices 104 and the IoT cloud server 102 may be connected with each other via a relay, a hub, and a gateway. It is understood that the electronic device 106, the plurality of devices 104, and the IoT cloud server 102 may be connected to each other in any of various manners (including those described above), and may be connected to each other in two or more of various manners (including those described above) at the same time.

The IoT cloud server 102 referred herein may be a server that obtains, stores, and manages device information mappings, functional capabilities, manufacturer provided information, and location information of each of the plurality of devices 104 present in a network environment. In an embodiment herein, the network environment may be an IoT environment including for example, but is not limited to, a smart home environment, a smart office environment, a smart hospital environment, and so on. The device information may include information such as, but is not limited to, an identification value (for example: device ID information/ unique identifier) of each of the plurality of devices 104, a device type of each of the plurality of devices 104, and so on. In an example herein, the identification value/device ID information may be, but is not limited to, a Media Access Control (MAC) identifier (MAC ID), a serial number, a unique device ID, and so on. The functional capabilities of the device may be, but not limited to, playing media (for example: audio, video or the like), capturing media, controlling lights, altering properties of air in a defined area (i.e., cooling/heating), purifying air, and so on. The location information includes information about a location of each of the plurality of devices 104. The location of the device 104 may indicate an area or a room (for example: a living room, a kitchen, a bedroom, a study room, a child room, a ward, a conference room, a factory unit, and so on) in the IoT environment, where the device 104 is present. The manufacturer provided information of the device 104 may include at least one of, but is not limited to, a model of the device 104, a year of manufacturing of device 104, a lifespan of the device 104, and so on. The IoT cloud server 102 may update the device information, the functional capabilities, and location information of the devices 104, on adding or removing any of the plurality of devices 104 in the IoT environment.

The IoT cloud server 102 may also obtain and store information such as, but are not limited to, a power on/off state, an action (for example: video play, audio play, movie play, purifying air, controlling lights, actuator state, actuator control, device capabilities, or the like) being performed by each of the plurality of devices 104, and so on. The IoT cloud server 102 may be configured as a hardware device independent of the electronic device 106 but is not limited thereto. The IoT cloud server 102 may be a component of the electronic device 106 or may be a server designed to be classified into software.

The plurality of devices 104 may be IoT devices capable of exchanging information with other devices (such as, the IoT cloud server 102, the electronic device 106, or the like). Examples of the plurality of devices 104 may be, but are not limited to, a smart phone, a mobile phone, a video phone, a computer, a tablet personal computer (PC), a netbook computer, a laptop, a wearable device, a vehicle infotainment system, a workstation, a server, a personal digital assistant (PDA), a portable multimedia player (PMP), an MP3 layer, a mobile medical device, a light, a voice assistant device, a camera, a home appliance, one or more sensors, and so on. Examples of the home appliance may be, but are not limited to, a television, a digital video disk (DVD) player, an audio device, a refrigerator, an air conditioner, an air purifier, a chimney, a cooktop, a vacuum cleaner, an oven, microwave, a washing machine, a dryer, a set-top box, a home automation control panel, a security control panel, a game console, an electronic key, a camcorder, an electronic picture frame, a coffee maker, a toaster oven, a rice cooker, a pressure cooker, and so on. Examples of the sensors may be, but are not limited to, a temperature sensor, a humidity sensor, an infrared sensor, a gyroscope sensor, an atmospheric sensor, a proximity sensor, an RGB sensor (a luminance sensor), a photosensor, a thermostat, an Ultraviolet (UV) light sensor, a dust sensor, a fire detection sensor, a carbon dioxide ($CO_2$) sensor, a smoke sensor, or any other equivalent sensor. A function of each sensor may be intuitively inferred by one of ordinary skill in the art based on its name, and thus, its detailed description is omitted.

The plurality of devices 104 may be deployed in various locations or areas or rooms in the IoT environment with which users may interact. The users may interact with the plurality of devices 104 directly. The users may also interact or connect with the plurality of devices 104 using the electronic device 106.

The plurality of devices 104 may perform one or more actions/operations based on their functional capabilities. Examples of the actions may be, but is not limited to, playing media (audio, video, or the like), capturing the media, purifying the air, performing cooling or heating of a defined area, controlling lights, sensing smoke, and so on. The device 104 may perform the one or more actions in conjunction with the other devices 104. The plurality of devices 104 may perform the respective one or more actions simultaneously. For example, in the smart home environment, a chimney, a cooktop, and a smoke sensor may perform the respective actions simultaneously/at a time.

The plurality of devices 104 may register with the IoT cloud server 102 by communicating the device information, the functional capabilities, the manufacturer provided information, and the location information to the IoT cloud server 102, once being deployed in the IoT environment. The user may register the plurality of devices 104 with the IoT cloud server 102 using the electronic device 106.

The plurality of devices 104 may also communicate state information to the IoT cloud server 102 or the electronic device 106. The state information may include at least one of, but is not limited to, the device information, event data, the manufacture provided information, timestamp data associated with the event data, and so on. The event data of the device 104 may indicate events occurred on the device 104 or operational modes of the device 104 or a state of the device 104, and values of the functional capabilities of the device 104 with respect to each event, but is not limited thereto. The events/operational mode/state of the device 104 may depict the action performed or being performed by the device 104. Embodiments herein use the terms "events", "operational mode", "state", "behavior", and so on, interchangeably to refer to the action/operation that may be performed by the device 104 according to its functional capabilities. The manufacturer provided information of the device 104 may include at least one of, but is not limited to, a model of the device 104, a year of manufacturing of the device 104/an age of the device 104, lifespan of the device 104, demographic (area/region) information, threshold limits of values of the functional capabilities of the device 104, and so on. The timestamp data of the device may indicate at least one of, but is not limited to, time, date, day, duration, or the like, of the events occurred on the device 104. In an example, the plurality of devices 104 may communicate the state information to the IoT cloud server 102 and/or the electronic device 106 continuously. In another example, the plurality of devices 104 may communicate the state information to the IoT cloud server 102 and/or the electronic device 106 at periodic intervals of time. In another example, the plurality of devices 104 may communicate the state information to the IoT cloud server 102 and/or the electronic device 106 on occurrence of pre-defined events. The pre-defined events may include initiation of the one or more actions on the one or more devices 104, or the like.

The electronic device 106 referred herein may be a device used to control the actions of the plurality of devices 104. In an embodiment, the electronic device 106 may be a user device that is being used by the user to connect, and/or interact, and/or control the plurality of devices 104. In another embodiment, the electronic device 106 may be a server that may be deployed in a specific IoT environment. The server may be configured as a hardware device independent of the IoT cloud server 102 but is not limited thereto. The server may be a standalone server or may be a server designed to be classified into software. Examples of the electronic device 106 may be, but is not limited to, a smart phone, a mobile phone, a video phone, a computer, a tablet personal computer (PC), a netbook computer, a laptop, a wearable device, a personal digital assistant (PDA), a workstation, a server, and so on.

The electronic device 106 obtains, stores, and maintains the state information from each of the devices 104 present in the IoT environment. In an example, the electronic device 106 may obtain the state information from each of the devices 104 through the communication network 108. In another example, the electronic device 106 may obtain the state information from each of the devices 104 through the IoT cloud server 102. The electronic device 106 also obtains, determines, or generates a control command for controlling each of the plurality of devices 104, by utilizing the stored state information. The electronic device 106 may transmit the control command to any of the devices 104 determined to perform an action based on the stored functional capabilities. The electronic device 106 may receive a result of performing the action according to the control command from the device 104 that performed the operation.

In an embodiment, the electronic device 106 may be configured to monitor and manage health of each of the plurality of devices 104 present in the IoT environment. The health of the device 104 refers to a condition/behavior of the device 104, which may be related to a condition of each of the hardware components of the device 104 or a condition of a software of the device 104. For example, the condition may be related to at least one of, but is not limited to, hardware components of the device 104, functioning/operation of the hardware components of the device, configurations of the device 104, applications implemented on the device 104, and so on. The electronic device 106 monitors the health of the device 104 to detect one or more anomalies in the device 104. The anomalies in the device 104 may refer to a change in condition/behavior of the device 104 or a deviation from the normal/expected condition of the device 104, for example, a defect in the hardware components of the device 104, a change in the functioning of the device 104/hardware components of the device 104, a change in the configurations of the device 104, a change/deviation in functioning of the applications implemented on the device 104, but not limited thereof.

In an embodiment, the electronic device 106 may manage the health of each of the devices 104 in the IoT environment by detecting the anomaly(ies) in the device 104 using a relation/correlation between the devices 104 and identifying historic issues and actions taken by the user to resolve the issues in a same demographic.

The electronic device 106 determines the relation/correlation between the devices 104 deployed in the IoT environment in a training/initialization phase. The training phase may be a learning phase, wherein the correlation between the devices has been monitored and analyzed for performing a health check of the devices 104.

For determining the correlation between the devices, the electronic device 106 monitors over time, the device(s) 104 in the IoT environment and collects the state information from the device 104. The state information includes information such as, but are not limited to, the device information, the event data and the associated timestamp data, the manufacturer provided information, and so on. In an example, the electronic device 106 may collect the state information from each of the device 104 continuously. In another example, the electronic device 106 may collect the state information from each of the device 104, at periodic intervals of time. In another example, the electronic device 106 may collect the state information from each of the device 104, on occurrence of the one or more events on the device 104. The electronic device 106 detects the one or more events on the device 104 and the values of the functional capabilities of the device 104 with respect to each event, using the event data included in the state information received from each device 104.

The electronic device 106 also collects the state information from the other devices 104 present in the IoT environment, on detecting the one or more events on the device 104. The electronic device 106 detects the one or more events on the other devices 104 and the values of the functional capabilities of the other devices 104 with respect to each event detected on the device 104, using the event data included in the state information received from each device 104.

On detecting the one or more events in the device 104 and the other devices 104, the electronic device 106 analyzes the timestamp data (included in the received state information) associated with respect to each event of the device 104 and the other devices 104 and divides each event of the device 104 and the other devices 104 into multiple bins. The bins may represent timeslots. The electronic device 106 may determine a width/duration of the bins/timeslots using a suitable mining method and an average duration of the events occurred on the device 104 and the other devices 104

(i.e., an average duration of usage of the device 104 and the other devices 104). In an example, the electronic device 106 may use binning based mining methods such as, but not limited to, density-based clustering method (DB SCAN method), Frequent Pattern (FP) growth mining method, and so on, to determine the width of the bins/timeslots. The binning based mining methods may determine the width of the bins/timeslots from statistical event data (that indicates distribution of the events associated with the devices 104). For example, the statistical event data may indicate that an AC uses 15 minutes to change a state for any temperate event, so that the width of the bin size has to be greater than 15 minutes for the events associated with the AC.

On dividing the events into the multiple bins/timeslots, the electronic device 106 generates a set of transactions by assembling/grouping the events that have been associated with the same bin/timeslot. Each transaction may include information about the one or more events associated with the same bin/timeslot and the associated device 104 or the other devices 104 with their respective values of the functional capabilities. The events associated with the same bin/timeslot may be the events that have being occurred in the same bin/timeslot on the same day (i.e., the events that occur simultaneously).

The electronic device 106 determines one or more co-used devices 104 for the device 104 in the IoT environment using the set of transactions/transaction data. The co-used devices 104 may be a combination of the other devices 104 that operate simultaneously with the device 104 by establishing a relation/correlation with the one or more events of the device 104. Embodiments herein use the terms such as "co-used devices", "other devices associated with the device", "secondary devices", "ambience of the device 104", "premises of the device 104", and so on, interchangeably to refer to devices that operate simultaneously with the device 104 and impact the event of the device 104. The electronic device 106 uses pattern mining methods to determine the one or more co-used devices 104 for the device 104. Examples of the pattern mining methods may be, but is not limited to, a Frequent Pattern (FP) growth mining method, a prefix span method, a Generalized Sequential Pattern (GSP) mining method, an Apriori based pattern mining method, and so on. A function of each pattern mining method may be intuitively inferred by one of ordinary skill in the art based on its name, and thus, its detailed description is omitted. On determining the one or more co-used devices 104, the electronic device 106 performs a mapping of the one or more co-used devices 104 and the associated state information with the device 104 and the associated state information and stores the mapping in a co-used devices event database 212. For example, the electronic device 106 may determine the devices such as, but are not limited to, a temperature sensor, a dust sensor, a humidity sensor, a CO2 sensor, and so on, as the co-used devices 104 for an air conditioner (AC) (an example of the device 104). The electronic device 106 performs the mapping of the temperature sensor, the dust sensor, the humidity sensor, and the CO2 sensor and the respective state information with the AC and its associated state information.

On determining the one or more co-used devices 104 for the device 104, the electronic device 106 determines a correlation of the one or more events of the device 104 with a change in events of the co-used devices 104. The change in events of the co-used devices 104 may also be referred as a change in ambience of the device 104/change in premises of the device 104 through the document. In an embodiment, the correlation of the one or more events of the device 104 with the change in events of the co-used devices 104 refers to a correlation/relationship of the one or more events of the device 104 with the values of the functional capabilities of the device 104 and the co-used devices 104. In an embodiment, the electronic device 106 trains a correlation module 304, which determines the correlation of the one or more events of the device 104 with the values of the functional capabilities of the device 104 and the co-used devices 104. Examples of the correlation module 304 may be, but is not limited to, a machine learning network, a convolutional neural network (CNN), a deep neural network (DNN), a recurrent neural network (RNN), a restricted Boltzmann Machine (RBM), a deep belief network (DBN), a bidirectional recurrent deep neural network (BRDNN), generative adversarial networks (GAN), a deep Q-networks, an Artificial Intelligence (AI) model, a regression based neural network, and so on. The correlation module includes a plurality of nodes, which may be arranged in layers. Examples of the layers may be, but is not limited to, a convolutional layer, an activation layer, an average pool layer, a max pool layer, a concatenated layer, a dropout layer, a fully connected layer, a SoftMax layer, and so on. A topology of the layers of the correlation module may vary based on the type of the correlation module. In an example, the correlation module may include an input layer, an output layer, and a hidden layer. The input layer receives an input (for example: training data depicting the change in the one or more events/state information/operational modes of the co-used devices 104) and forwards the received input to the hidden layer. The hidden layer transforms the input received from the input layer into a representation, which can be used for generating the output in the output layer. The hidden layers extract useful/low level features from the input, introduce non-linearity in the network and reduce a feature dimension to make the features equivariant to scale and translation. The nodes of the layers may be fully connected via edges to the nodes in adjacent layers. The input received at the nodes of the input layer may be propagated to the nodes of the output layer via an activation function that calculates the states of the nodes of each successive layer in the network based on coefficients/weights respectively associated with each of the edges connecting the layers.

For training the correlation module 304, the electronic device 106 fetches the state information of the device 104 and the associated co-used devices 104 from the co-used devices event database 212, as an input dataset or training dataset for the correlated module 304. The electronic device 106 trains the correlation module 304 over the training dataset to determine the correlation of the one or more events of the device 104 with the values of the functional capabilities of the device 104 and the co-used devices 104. The electronic device 106 performs a statistical correlation analysis on the values of the functional capabilities of the device 104 and the associated co-used devices 104 with respect to each event of the device 104 and determines highly correlated functional capabilities of the device 104 and the associated co-used devices 104 for each event of the device 104. In an example, the highly correlated functional capabilities may be determined using methods such as, but are not limited to, a Pearson Correlation Coefficient method, a Euclidian distance and Manhattan method, a Minskosky and Mahalanobis distance method, and so on. The highly correlated functional capabilities with respect to the event of the device 104 may indicate the functional capabilities of the device 104 and the co-used devices 104 that may impact or have a relationship with the corresponding event of the device 104. For example, consider that an AC may be associated with the co-used devices such as, but are not limited to, an indoor temperature sensor, an outdoor temperature sensor, a dust sensor, a humidity sensor, a $CO_2$ sensor, and so on, and an example event of the AC may be temperature change. Further, consider that the AC may be associated with the functional capabilities such as, but are not limited to, an AC target temperature, an operating mode of the AC, a fan speed, pre-defined time for changing the temperature (AC elapsed time) according to operating mode, and so on. In such a scenario, the electronic device 106 determines that the example event of temperature change may have high correlation with the AC target temperature (an example functional capability of the AC), the functional capabilities of the indoor temperature sensor and the functional capabilities of the dust sensor.

The electronic device 106 analyzes the determined highly correlated functional capabilities and/or pre-defined threshold limits of the functional capabilities of the device 104 and the associated co-used devices 104 and generates a threshold of values of the functional capabilities of the device 104 and the associated co-used devices 104 with respect to each of the one or more events of the device 104. In an embodiment, the electronic device 106 may generate the threshold of values of the functional capabilities of the device 104 and the associated co-used devices 104 with respect to each of the one or more events of the device 104 using a linear regression with gradient descent method. The pre-defined threshold limits of the functional capabilities of the device 104 and the associated co-used devices 104 may be specified by a manufacturer of each of the devices 104 (that may be determined from the manufacturer provided information included in the received state information from the devices 104). The threshold of values of the functional capabilities of the device 104 and the associated co-used devices 104 generated with respect to each event of the device 104 may be possible/allowable values of the functional capabilities of the device 104 and the associated co-used devices 104 that are within a normal range for the corresponding event of the device 104.

In an embodiment, the threshold of values of the functional capabilities of the device 104 and the associated co-used devices 104 generated with respect to each event of the device 104 may refer to the correlation of the one or more events of the device 104 with the functional capabilities of the device 104 and the associated co-used devices. Embodiments herein use the terms such as "correlation between the devices", "inter-device correlation", "correlation between the state change of the co-used devices and events of the device", "correlation of the one or more events of the device with the functional capabilities of the device and the associated co-used devices", "correlation of the one or more events of the device with the threshold of values of the functional capabilities of the device and the associated co-used devices", "correlation between the one or more events of the device and the change in ambience (i.e., a change in events/functional capabilities of the co-used devices 104 with respect to the event of the device), and so on, interchangeably to refer to a relation among the device 104 and the associated co-used devices 104 with respect to each event of the device 104.

In an embodiment, the electronic device 106 may initialize random weights/coefficients for the correlation module 304 while training the correlation module 304 to determine the threshold of values of the functional capabilities of the device 104 and the associated co-used devices 104 with respect to each of the one or more events of the device 104. In an example, the weights/coefficients may vary between 0 and 1. In another embodiment, the electronic device 106 may use the weights/coefficients that have been used by other devices in a same demographic for training the correlation module 304. The electronic device 106 may fetch the weights/coefficients that have been used by other devices from the IoT cloud server 102. The electronic device 106 stores the weights/coefficients used to train the correlation module 304. The electronic device 106 also communicates the weights/coefficients used to train the correlation module 304 to the IoT cloud server 102 for storage. In an embodiment, the electronic device 106 may dynamically vary the weights/coefficients of the correlation module 304 to determine the threshold of values of the functional capabilities of the device 104 and the associated co-used devices 104 with respect to each of the one or more events of the device 104, with improved accuracy. The electronic device 106 also performs a mapping of the threshold of values of the functional capabilities of the device 104 and the associated one or more co-used devices 104 with respective each of the one or more events of the device 104 and stores the mapping in a correlation event database 214.

The electronic device 106 may perform the health check on each of the device 104 to detect the anomalies in the device 104 in an execution phase. The execution phase may be a phase/mode, in which the electronic device 106 initiates the health check on each of the devices 104 present in the IoT environment. The electronic device 106 detects the anomaly in the device 104, based on the correlation between the device 104 and the associated co-used devices 104.

The electronic device 106 may receive the state information from the device(s) 104 present in the IoT environment. In an example, the electronic device 106 may receive the state information from each of the plurality of devices 104 continuously. In another example, the electronic device 106 may also receive the state information from each of the plurality of devices 104 at periodic intervals of time. In another example, the electronic device 106 may also receive the state information from each of the plurality of devices 104 on occurrence of the event on the device 104. The electronic device 106 detects an occurrence of the event(s) on the device 104 and the values of the functional capabilities of the device 104 with respect to the detected event, using the received state information from the device 104.

On detecting the occurrence of the event(s) on the device(s) 104, the electronic device 106 monitors the one or more co-used devices 104 of the device 104 and detects the change in events on the one or more co-used devices 104 (i.e., the change in ambience). The electronic device 106 may determine the co-used devices 104 for the device 104 by fetching the stored mappings of the co-used devices 104 with the device 104 in the co-used devices event database 212. The electronic device 106 may monitor the co-used devices with respect to the occurrence of the events on the device 104. Examples of the sensors deployed for monitoring the devices 104 may be, but are not limited to, a camera, a microphone, a thermostat, a contact sensor, and so on. The electronic device 106 receives the state information from the co-used devices 104 and detects the values of the functional capabilities of the co-used devices 104 with respect to the event detected on the device 104.

On detecting the values of the functional capabilities of the device 104 and the associated co-used devices 104, the electronic device 106 accesses the mapping of the threshold of values of the functional capabilities of the device 104 and the associated co-used devices 104 for the event detected on the device 104, from the correlation event database 214. The electronic device 106 checks if the detected values of the functional capabilities of the device 104 and the associated co-used devices 104 satisfy the respective threshold of values. If the detected values of the functional capabilities of the device 104 and the associated co-used devices 104 satisfy the respective threshold of values (for example: the detected values of the functional capabilities do not deviate beyond the respective threshold of values), the electronic device 106 determines that the device 104 is functioning properly/healthy and there are no anomalies in the device 104. If any of the detected values of the functional capabilities of the device 104 and the associated co-used devices 104 do not satisfy the respective threshold of values (for example: the detected values of the functional capabilities deviate beyond the respective threshold of values), the electronic device 106 detects the anomaly(ies) in the device 104.

The electronic device 106 may also be configured to determine one or more causes/root causes/issues for the detected anomaly in the device 104. The electronic device 106 may determine the one or more causes using a multi-class classifier module 308. Examples of the multi-class classifier module 308 may be, but are not limited to, a machine learning network, a convolutional neural network (CNN), a deep neural network (DNN), a recurrent neural network (RNN), a restricted Boltzmann Machine (RBM), a deep belief network (DBN), a bidirectional recurrent deep neural network (BRDNN), generative adversarial networks (GAN), a deep Q-networks, an Artificial Intelligence (AI) model, a regression based neural network, and so on.

For determining the one or more causes, the electronic device 106 analysis information such as, but are not limited to, real-time state data, deviation data, the detected anomaly in the device 104, an anomaly mapping, historical device health data, and so on, and determines a plurality of probable causes for the anomaly detected in the device 104. The real-time state data may refer to the values of the functional capabilities of the device 104 and the associated co-used devices 104 with respect to the event detected on the device 104. The deviation data may indicate a difference between the values of the functional capabilities of the device 104 and the associated co-used devices 104 from the respective threshold of values. The electronic device 106 may determine the deviation data using the detected values of the functional capabilities of the device 104 and the associated co-used devices 104 with respect to the event detected on the device 104 and the respective thresholds of values (which may be accessed from the correlation event database 214). The anomaly mapping may include a list of anomalies associated with the values of the functional capabilities of the device 104 and the associated co-used devices 104 and the one or more causes. The historical device health data may include information about at least one of, but is not limited to, the one or more causes determined for previous one or more events of the device 104, a frequency of occurrence of the one or more anomalies on the device 104, a demographic (area/region) of the device, remedies taken by the user to resolve the anomaly, and so on. The electronic device 106 may determine the anomaly mapping and the historical device health data from a device health knowledge database 216.

The electronic device 106 further performs a collaborative decision analysis on information such as, but are not limited to, the determined plurality of probable causes, an ambient environment input data, the manufacturer provided information, and so on, and determines the causes for the anomalies with confidence scores. The confidence score of the anomaly may be a value indicating a probability of the cause. In an example herein, the electronic device 106 may calculate the confidence score for each cause based on historical relevance of the correlated vectors/correlated features/functional capabilities with a comparison of population data (collected information about the values of the functional capabilities of the devices with respect to the one or more events, over the time). In another example, the multi-class classifier module 308 used to determine the one or more causes for the anomaly may calculate the confidence score for each cause. In another example, the electronic device 106 may calculate the confidence score for each cause using statistical hypothesis P-value based analysis method. In another example, the electronic device 106 may use at least one of, a neural network based forward propagation multiclass classification model, a logistics regression method, a boosting combination method, or the like, to calculate the confidence score for each cause. The cause associated with the highest confidence score, compared to the other causes may be a high probable cause for the anomaly in the device 104. The ambient environment input data may indicate a state of surrounding environment of the device 104. The electronic device 106 may receive and process data sensed by sensors/environment sensors deployed in the IoT environment for monitoring the surrounding of the device 104 to determine the ambient environment input data. In an example, the ambient environment input data may indicate at least one of, but is not limited to, open/close states of doors, windows, or the like, collection of dust, presence of pollen, outside temperature, weather conditions (for example: storm/rainy, cloudy, or the like), spillage of food, power surge and so on. Examples of the one or more sensors used for determining the ambient environment input data may be, but are not limited to, a microphone, a camera, a thermostat, a contact sensor, a robot cleaner, a pollen sensor, a smart plug, and so on. The manufacturer provided information of the device 104 may include at least one of, but is not limited to, a model of the device 104, a year of manufacturing of the device 104/an age of the device 104, lifespan of the device 104, demographic information, threshold limits of values of the functional capabilities of the device 104, and so on.

On determining the causes with the confidence scores, the electronic device 106 selects the one or more causes with the highest confidence scores, compared to the other causes as the one or more root causes for the anomaly detected in the device 104. The electronic device 106 provides a recommendation of the one or more causes of the anomaly to the user for managing the health of the device 104.

The electronic device 106 may also be configured to derive one or more emotions depicting the one or more causes of the anomaly and one or more remedies for resolving the determined anomaly in the device 104. The emotion may be used to indicate a class of feelings or conditions of the device 104 to the user. The emotion may include feelings such as, but not limited to, happy, sadness, fear, disgust, and so on. For example, the emotion including at least one of, but is not limited to, happy, or the like, may be used to indicate zero anomalies in the device 104. The emotion including at least one of, but is not limited to, sadness, fear, disgust, or the like, may be used to indicate the anomaly in the device 104 and the cause of the anomaly. The emotions may be represented using at least one of, but is not limited to, a media (for example; an image, a video, a Graphics Interchange Format (GIF), or the like), text, an icon, a symbol, graphical media, and so on. The remedies may indicate a repair action that may be performed to resolve or fix the anomaly in the device 104. Examples of the remedies may be, but are not limited to, replacing the device 104 or components of the device 104, repairing components of the device 104, contacting a technician/expert, turning OFF/ON the devices 104, and so on.

For deriving the emotion and the one or more remedies, the electronic device 106 may fetch a mapping of the emotions with the causes of the anomaly and the one or more remedies for each cause of the anomaly from an emotion health mapper database 218. The electronic device 106 derives the one or emotions and the one or more remedies for the determined one or more causes of the anomaly from the fetched mapping. The electronic device 106 provides a recommendation of the derived one or more remedies with the one or more emotions to the user. Therefore, the user may easily understand the cause of the anomaly in the device 104 using the one or more emotions and resolve the anomaly in the device 104 using the one or more remedies.

In an embodiment, if the electronic device 106 is the user device, the electronic device 106 displays the one or more emotions and the one or more remedies to the user. In another embodiment, if the electronic device 106 is the server, the electronic device 106 provides the emotion, and the one or more remedies to the user device using the communication network 108, to be displayed to the user.

The electronic device 106 may also be configured to perform a polling to detect the remedies taken by the user to resolve or fix the detected anomaly in the device 104. The electronic device 106 may consider the detected remedies taken by the user to resolve or fix the detected anomaly in the device 104 as a feedback for determining the anomaly of the devices 104 in future.

In an embodiment, the IoT cloud server 102 may be the electronic device 106, which may perform at least one intended function of the electronic device 106. The IoT cloud server 102 may manage the health of the device 104 using the correlation between the event in the device 104 and the change in the ambience.

FIG. 1 shows exemplary blocks of the IoT system 100, but it is to be understood that other embodiments are not limited thereon. In other embodiments, the IoT system 100 may include more or less number of blocks. Further, the labels or names of the blocks are used only for illustrative purpose and does not limit the scope of the embodiments herein. One or more blocks can be combined together to perform same or substantially similar function in the IoT system 100.

Figure 2:
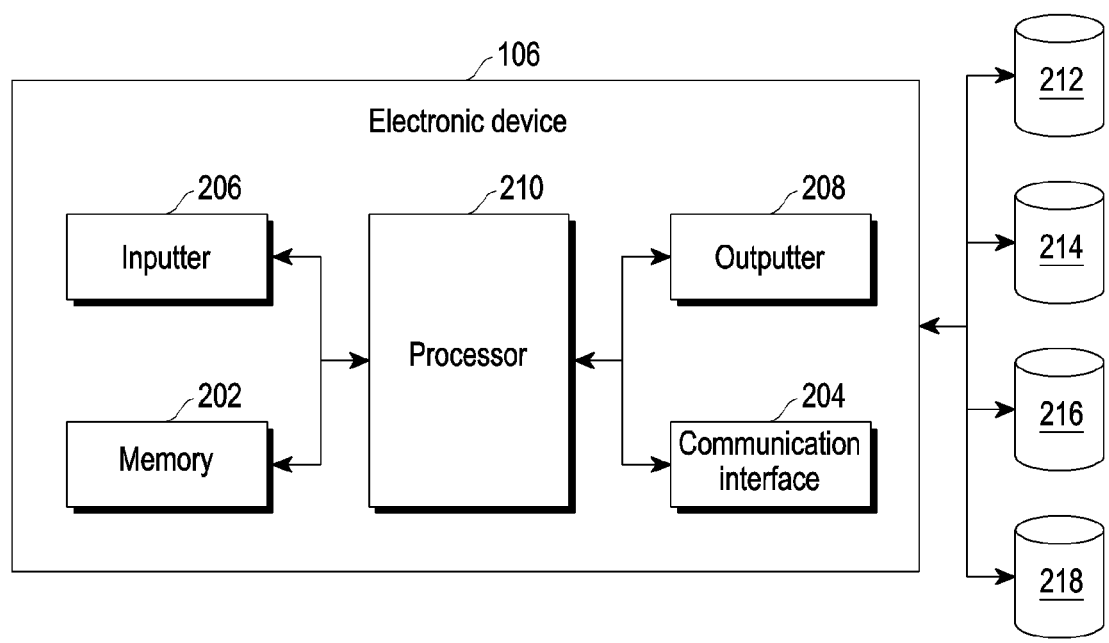
FIG. 2 illustrates a block diagram depicting various components of an electronic device for managing health of device(s) in the IoT environment, according to embodiments as disclosed herein.

FIG. 2 is a block diagram depicting various components of the electronic device 106 for managing the health of the device(s) 104 in the IoT environment, according to embodiments as disclosed herein.

The electronic device 106 includes a memory 202, a communication interface 204, an inputter 206, an outputter 208, and a processor 210. The electronic device 106 may also be coupled with the co-used devices event database 212, the correlation event database 214, the device health knowledge database 216, and the emotion health mapper database 218. The co-used devices event database 212 may include the mapping of the co-used devices 104 and the associated state information with each of the devices 104 and associated state information. The correlation event database 214 may include information about the threshold of values of the functional capabilities of the device 104 and the associated co-used devices 104 with respect to the one or more events occurred on the device 104 (i.e., the correlation between the one or more events occurred on the device 104 and the change in the ambience). The device health knowledge database 216 may include at least one of, but is not limited to, the anomaly mapping, the historical device health data, the manufacturer provided issue information, and so on. The emotion health mapper database 218 may include the mapping of the emotions with the one or more causes of the anomalies and the one or more remedies for resolving the anomalies.

The memory 202 may store at least one of, but is not limited to, the state information of the devices 104, the threshold values of the functional capabilities of the co-used devices 104 and the device 104 for the one or more events, the causes of the anomalies in the devices 104, the emotions generated for the causes of the anomalies, the remedies for the anomalies, and so on. The memory 202 may also store a device health manager 300, which may be executed on the processor 210 for managing the heath of each device 104 in the IoT environment. The memory 202 referred herein may include at least one type of storage medium, from among a flash memory type storage medium, a hard disk type storage medium, a multi-media card micro type storage medium, a card type memory (for example, an SD or an XD memory), random-access memory (RAM), static RAM (SRAM), read-only memory (ROM), electrically erasable programmable ROM (EEPROM), programmable ROM (PROM), a magnetic memory, a magnetic disk, or an optical disk.

The communication interface 204 may include one or more components in which the electronic device 106 communicates with another device (for example: another electronic device 106, the IoT cloud server 102, the plurality of devices 104, and so on) using data communication methods that have been supported by the communication network 108. The communication interface 204 may include the components such as, a wired communicator, a short-range communicator, a mobile/wireless communicator, and a broadcasting receiver.

The wired communicator may enable the electronic device 106 to communicate with the other devices (for example: another electronic device 106, the IoT cloud server 102, the plurality of devices 104, and so on) using the communication methods such as, but not limited to, wired LAN, the Ethernet, and so on. The short-range communicator may enable the electronic device 106 to communicate with the other devices using the communication methods such as, but is not limited to, Bluetooth low energy (BLE), near field communicator (NFC), WLAN (or Wi-fi), Zigbee, infrared data association (IrDA), Wi-Fi direct (WFD), Ultra-wide band communication, Ant+ (interoperable wireless transfer capability) communication, shared wireless access protocol (SWAP), wireless broadband internet (Wibro), wireless gigabit alliance (WiGiG), and so on. In an embodiment, the electronic device 106 may obtain the location information/position information of the electronic device 106 through the short-range wireless communicator. In an example, the electronic device 106 may determine a location/place, where the electronic device 106 is located through an NFC tag. In another example, the electronic device 106 may determine a location/place, where the electronic device 106 is located through an identifier of Wi-Fi. In another example, the electronic device 106 may determine the place/location, where the electronic device 106 is located by confirming a service set identifier (SSID) of the Wi-Fi to which the electronic device 106 has been connected. The mobile communicator may transceiver wireless signals with at least one of a base station, an external terminal, or a server on a mobile communication network/cellular network. In an example, the wireless signal may include a speech call signal, a video telephone call signal, or various types of data, according to transceiving of text/multimedia messages. The broadcasting receiver may receive a broadcasting signal and/or broadcasting-related information from the outside through broadcasting channels. The broadcasting channels may include satellite channels and ground wave channels. In an embodiment, the electronic device 106 may or may not include the broadcasting receiver.

The inputter 206 may be configured to receive the state information from the device(s) 104, on which the event is occurred. The inputter 206 may process the received state information to detect the event occurred on the device 104. The inputter 206 may also be configured to receive and process data sensed by the one or more ambient sensors in the IoT environment to determine the change in events of the device 104. The inputter 206 may also be configured to receive and process data sensed by the one or more environment sensors in the IoT environment to determine the ambient environment input of the device 104.

The outputter 208 may be configured to provide an output to the user. The output may indicate at least one of, but is not limited to, the anomalies detected in the device(s) 104, the emotion depicting the cause of the anomalies, the remedies for resolving the anomalies, and so on. In an embodiment, if the electronic device 106 is the server, the outputter 208 may receive the output from the processor 210 and communicates the output to the user device through the communication interface 204, to be displayed to the user. In another embodiment, if the electronic device 106 is the user device, the outputter 208 may receive the output from the processor 210 and include for example, but is not limited to, a sound outputter, a display, a vibration motor, a User Interface (UI) module, and so on, to provide the received output to the user. In an example herein, the output may be provided as, but is not limited to, an audio signal, a video signal, a vibration signal, text, and so on. The sound outputter may be a speaker that receives the output from the processor 210 and provides the output as the audio signal to the user. The display receives the output from the processor 210 and displays the output as at least one of, an image, a video signal, text, or the like to the user. The UI module may provide a specialized UI or graphics user interface (GUI), or the like, to provide the output to the user.

The processor 210 may include one or a plurality of processors. The one or a plurality of processors may be a general purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU). The processor 210 may be configured to manage the health of each of the devices 104 in the IoT environment based on the correlation between the devices 104. The processor 210 may execute the device health manager 300 stored in the memory 202 to manage the health of the devices 104 in the IoT environment.

The processor 210 may be configured to determine the correlation between the devices 104, which may be used to detect the anomaly in the device 104. For determining the correlation between the devices 104, the processor 210 monitors over the time, the device(s) 104 in the IoT environment using the one or more sensors and collects the state information from the device 104. The state information may include at least one of, but is not limited to, the device information, the event data and the associated timestamp data, the manufacturer provided information, and so on. Based on the event data included in the collected state information, the processor 210 determines the one or more events on the device 104 and the values of the functional capabilities of the device 104 with respect the one or more events. The processor 210 further monitors the other devices in the IoT environment using the one or more sensors and records/determines the change in events of the other devices present in the IoT environment (i.e., the change in ambience), due to the one or more events of the device 104. The processor 210 collects the state information from the other devices 104. Based on the event data included in the collected state information, the processor 210 determines the events occurred on the other devices 104 and the values of the functional capabilities of the other devices 104, with respect to the one or more events occurred on the device 104. The processor 210 analyses each event occurred on the device 104 and the other devices 104 based on the timestamp data associated with each event and using the pattern mining method to detect the co-used devices 104 for the device 104. The processor 210 determines the correlation of each event on the device 104 with the threshold of values of the functional capabilities of the device 104 and the associated co-used devices 104. For determining the correlation between the device 104 and the co-used devices 104, the processor 210 performs the statistical correlation analysis on the values of the functional capabilities of the co-used device 104 and the device 104 with respect to each event to determine the highly correlated functional capabilities of the device 104 and the co-used devices 104 for each event. The processor 210 analyses the highly correlated functional capabilities and/or the pre-defined threshold limits of the functional capabilities of the device 104 and the co-used devices 104 using the linear regression with gradient descent method and generates the threshold of values of the functional capabilities of the device 104 and the co-used device 104 for each event on the device 104. The processor 210 performs the mapping of the threshold of values of the functional capabilities of the device 104 and the co-used device 104 for each event of the device 104 and stores the mapping in the correlated event database 214.

The processor 210 may also be configured to detect the anomaly(ies) in the device(s) 104 based on the determined correlation between the devices 104. For detecting the anomaly in the device 104, the processor 210 collects the state information from the device 104 in the IoT environment and detects the occurrence of the event on the device 104 and the values of the functional capabilities of the device 104 with respect to the detected event. On detecting the event on the device 104, the processor 210 monitors the change in the events on the co-used devices 104 (the change in ambience) due to the event occurred on the device 104. The processor 210 collects the state information from the co-used devices 104 and detects the values of the functional capabilities of the co-used devices 104, due to the change in the events occurred on the co-used devices 104. The processor 210 compares the detected values of the functional capabilities of the device 104 and the co-used devices 104 with respect to the detected event on the device 104 with the respective threshold of values of the functional capabilities stored in the correlation event database 214 for the detected event on the device 104. The processor 210 detects proper functioning of the device 104, if the detected values of the functional capabilities of the device 104 and the co-used devices 104 do not deviate beyond the respective threshold of values of the functional capabilities. The processor 210 may enable the outputter 208 to provide a notification of zero anomalies in the device 104 to the user with the suitable emotion. The processor 210 detects the anomaly(ies) in the device 104, if any of the detected values of the functional capabilities of the device 104 and the co-used devices 104 deviate beyond the respective threshold of values of the functional capabilities. The processor 210 may enable the outputter 208 to provide a notification of the anomaly detected in the device 104 to the user.

The processor 210 may also be configured to determine the one or more causes for the anomaly detected in the device 104. For detecting the one or more causes for the anomaly, the processor 210 determine the deviation data using the detected values of the functional capabilities of the device 104 and the co-used devices 104 with respect to the detected event on the device 104 and the respective threshold of values of the functional capabilities. The processor 210 also accesses the anomaly mapping and the historical device health data from the device health knowledge database 216. The processor 210 analyses at least one of, but is not limited to, the real time data, the deviation data, the detected anomaly in the device, the anomaly mapping, the historical device health data, and so on, to determine the probable causes for the anomaly detected in the device 104. On determining the probable causes for the detected anomaly, the processor 210 collects the data from the one or more sensors deployed in the IoT environment to monitor the environment and determines the ambient environment input data. The processor 210 also accesses the manufacturer provided information from the device health knowledge database 216. The processor 210 performs the collaborative decision analysis on at least one of, but is not limited to, the probable causes for the detected anomaly, the ambient environment input data, the manufacturer provided information, and so on, and determines the causes for the anomalies with the confidence scores.

Embodiments herein further explain the determination of the causes for the anomalies with the confidence scores using the logistics regression method as an example, but it may be obvious to a person skilled in the art that any other methods may be used to determine the causes with the confidence scores.

The processor 210 may use the logistics regression method with two class classification for calculating confidence score for each determined cause of the anomaly. The processor 210 applies discriminant values of the classes to a SoftMax function to calculate the confidence score/confidence of posterior probability of one class as depicted below:

$$P1 \text{ (degree of confidence/confidence score of class } 1) = \exp(d1)/(\exp(d1)+\exp(d2))$$

wherein, d1 and d2 are the discriminant values of the classes. Similarly, the confidence score/confidence of posterior probability of another class may be calculated as:

$$P1\left(\text{degree of } \frac{\text{confidence}}{\text{confidence}} \text{ score of class } 1\right) = (1 - P1)$$

The processor 210 selects the one or more causes with the highest confidence score, compared to the other causes as the one or more causes for the anomaly detected in the device 104.

The processor 210 may also be configured to derive the one or more emotions depicting the one or more causes of the anomaly and the one or more remedies for resolving the detected anomaly in the device 104. The processor 210 fetches the one or more emotions and the one or more remedies for the detected anomaly or cause of the anomaly by accessing the emotion health mapper database 218 through the communication interface 204. The processor 210 may recommend the one or more remedies to the user for resolving the detected anomaly in the device 104 with the one or more emotions that depict the one or more causes of the anomaly. Therefore, the user may easily understand the cause of the anomaly. If the electronic device 106 is the user device, the processor 210 may provide the emotion and the remedies to the outputter 208 as the output and enable the outputter 208 to provide the output to the user. If the electronic device 106 is the server, the processor 210 may communicate the emotion and the remedies to the user device to be displayed to the user.

The processor 210 may also be configured to check the remedies taken by the user to resolve the anomaly detected in the device 104. In an embodiment, the processor 210 may receive an input from the user (from an application configured on the user device) related to the remedies taken by the user to resolve the anomaly in the device 104. In another example, the processor 210 may check the remedies taken by the user to resolve the anomaly detected in the device 104 by performing an automated correlation study of faulty devices (devices associated with the anomalies) in periodic nature to identify if the anomalies are fixed. In another example, the processor 210 may maintain and use replacement and log entries in a database/memory to check the remedies taken by the user to resolve the anomaly detected in the device 104. The replacement and log entries may include service logs and may be continuously updated with information about the events and fixing of the anomalies associated with the devices 104. The processor 210 may consider the remedies taken by the user to resolve the anomaly detected in the device 104 as the feedback for improving determination of the correlation of the one or more events of the device 104 with the values of the functional capabilities of the device 104 and the co-used devices 104 in a future. The processor 210 may also consider the remedies taken by the user to resolve the anomaly detected in the device 104 as the feedback for improving determination of the one or more causes for the anomaly detected in the device 104 in future. Thus, improving accuracy of detection of anomaly in the device 104 by preventing incorrect anomalies.

Figure 3:
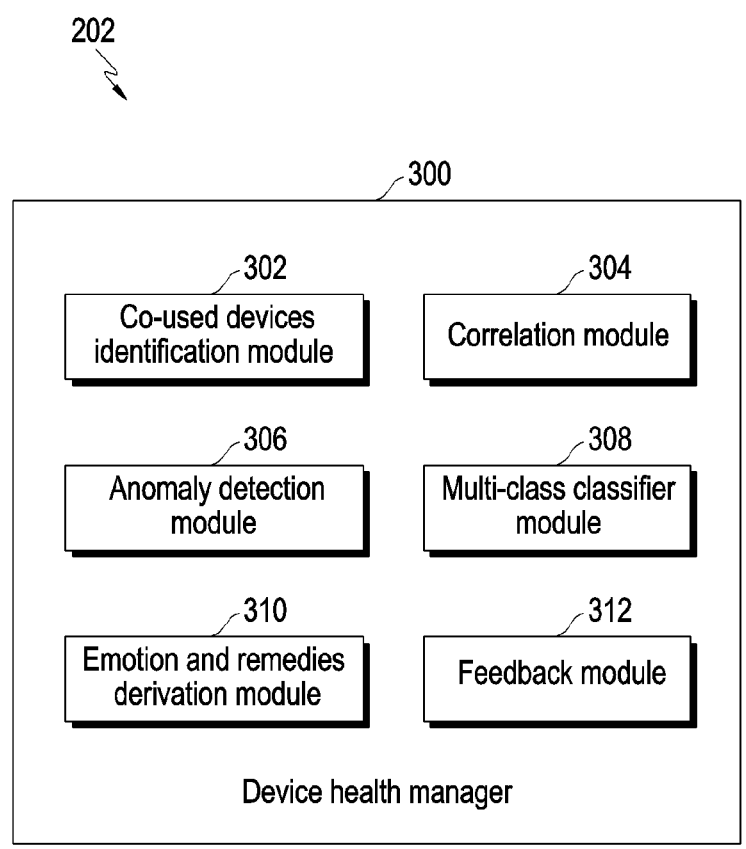
FIG. 3 illustrates an example diagram depicting a device health manager for managing the health of the devices in the IoT environment, according to embodiments as disclosed herein.

FIG. 3 is an example diagram depicting the device health manager 300 for managing the health of the devices 104 in the IoT environment, according to embodiments as disclosed herein. The device health manager 300 can be included in the electronic device 106.

The device health manager 300 may be stored in the memory 202 and executed by the processor 210 to manage the health of the devices 104 in the IoT environment. The device health manager 300 may include a co-used devices identification module 302, the correlation module 304, an anomaly detection module 306, the multi-class classifier module 308, an emotion and remedies deriving module 310, and a feedback module 312.

In an embodiment, the correlation module 304 and the multi-class classifier module 308 may be neural networks comprising of a plurality of neural network layers. Each layer has a plurality of weight values and performs a layer operation through calculation of a previous layer and an operation of a plurality of weights/coefficients. Examples of the neural networks include at least one of, but is not limited to, a convolutional neural network (CNN), a deep neural network (DNN), a recurrent neural network (RNN), a restricted Boltzmann Machine (RBM), a deep belief network (DBN), a bidirectional recurrent deep neural network (BRDNN), generative adversarial networks (GAN), a regression based neural network, a deep Q-network, and so on.

The correlation module 304 and the multi-class classifier module 308 may be trained using at least one learning method to determine the correlation between the one or more events on the device(s) 104 and the change in the ambience, and to determine the one or more issues/causes for the anomalies in the device(s) 104 respectively. Examples of the learning method may be, but are not limited to, supervised learning, unsupervised learning, semi-supervised learning, reinforcement learning, regression-based learning, and so on. A function associated with the learning method may be performed through the non-volatile memory, the volatile memory, and the processor 210.

The processor 210 may include one or a plurality of processors. At this time, one or a plurality of processors may be a general purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The one or a plurality of processors determine the correlation between the one or more events on the device(s) 104 and the change in the ambience, and determine the one or more issues/causes for the anomalies in the device(s) 104 in accordance with a predefined operating rule of the correlation module 304 and the multi-class classifier module 308 stored in the non-volatile memory and the volatile memory. The predefined operating rules of the correlation module 304 and the multi-class classifier module 308 are provided through training the correlation module 304 and the multi-class classifier module 308 using the learning method.

Here, being provided through learning means that, by applying the learning method to a plurality of learning data (for example: the trained data set including the values of the functional capabilities of the co-used devices and the device 104 with respect to the one or more events monitored on the device 104 over the time, the anomaly mapping, the historical device health data, the manufacturer provided information, or the like), a predefined operating rule or AI model of a desired characteristic is made. The determination of the correlation between the one or more events on the device(s) 104 and the change in the ambience, and determination of the one or more issues/causes for the anomalies in the device(s) 104 may be performed in the electronic device 106 itself in which the learning according to an embodiment is performed, and/or may be implemented through a separate server/system.

The co-used devices identification module 302 may be configured to identify the one or more co-used devices/other devices 104 for each of the devices 104 in the IoT environment. The one or more co-used devices 104 may be the devices 104 that operate simultaneously with the device 104. The one or more events occurred on the device 104 may impact the change in the events or the functional capabilities of the co-used devices 104.

Figure 4:
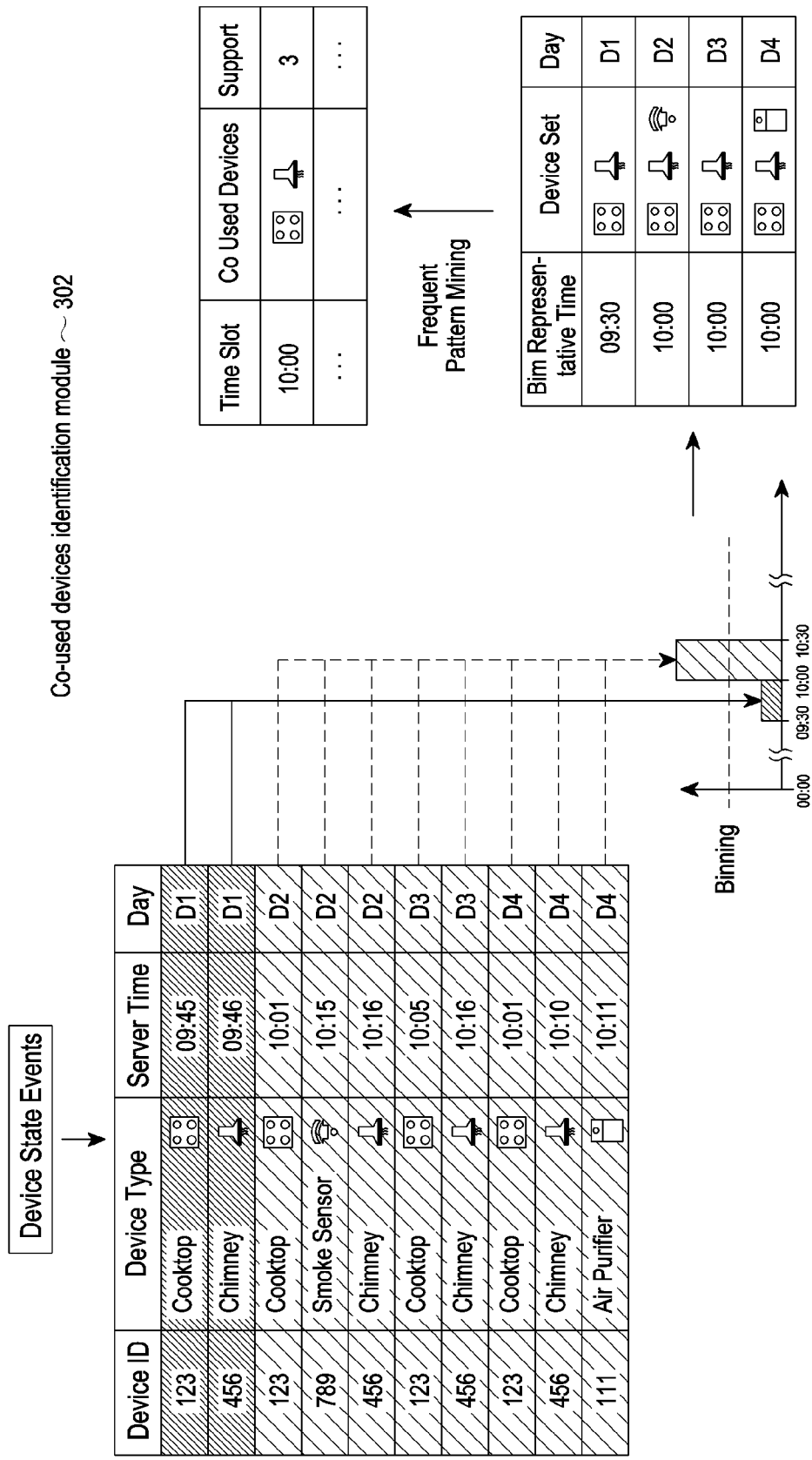
FIG. 4 illustrates an example diagram for identifying the co-used devices in the IoT environment, according to embodiments as disclosed herein.

Consider an example scenario, as depicted in FIG. 4, wherein the co-used devices identification module 302 may collect the state information (including the device information, the event data and the associated timestamp data, the manufacturer provided information, or the like) from the devices 104 such as, but not limited to, a cooktop, a chimney, a smoke sensor, an air purifier, and so on for four days (for example). In such a scenario, the co-used devices identification module 302 identifies the events occurred on the cooktop, the chimney, the smoke sensor, and the air purifier using the event data included in the state information received from each of the devices 104. The co-used devices identification module 302 performs a bucketing/binning to divide the events being occurred on the cooktop, the chimney, the smoke sensor, and the air purifier over different timeslots into multiple bins/timeslots. In an example herein, the co-used devices identification module 302 may divide the events occurred on the chimney, and the cooktop on a day D1 into an example bin/timeslot of 9-30, the events occurred on the chimney, the cooktop, and the smoke sensor on a day D2 into an example bin/timeslot of 10:00, the events occurred on the cooktop and the smoke sensor on a day D3 into an example bin/timeslot of 10:00, and the events occurred on the cooktop, the smoke sensor, and the air purifier on a day D4 into an example bin/timeslot of 10:00. The co-used devices identification module 302 forms the set of transactions based on the dividing of the events into the timeslots. Each transaction may include information about the events associated with the same bin/timeslot, the device information/device IDs of the devices 104 associated with the events of the same bin//timeslot, and the timeslot/bin associated with the events. The co-used devices identification module 302 applies the pattern mining method on the set of transactions to determine the co-used devices 104. In an example, the co-used devices identification module 302 may use a FP growth mining method (an example of the pattern mining method) to determine the co-used devices 104. The FP growth mining method ingests the set of transactions of the devices used simultaneously, and outputs the combination of the devices, on which the events occur frequently at the same time. In an example herein, the co-used devices identification module 302 may determine the chimney may be the co-used device for the cooktop. Thus, the events being occurring on each of the chimney and the cooktop may impact the functional capabilities of each other.

Consider another example scenario, wherein the co-used devices identification module 302 may collect over the time, the state information from the devices 104 such as, but not limited to, an AC, an indoor temperature sensor, a humidity sensor, a dust sensor, an outdoor sensor, a CO2 sensor, and so on. In such a scenario, the co-used devices identification module 302 may detect that the indoor temperature sensor, the dust sensor, and the outdoor sensor may be the co-used devices for the AC.

On determining the co-used devices, the co-used devices identification module 302 may perform the mapping of the co-used devices 104 and the associated state information with the respective device 104 and the associated state information in the co-used devices event database 212.

The correlation module 304 may be configured to determine the correlation between the one or more events of the device 104 and the change in the ambience. The change in ambience refers to the change in the functional capabilities of the other devices associated with device 104 (i.e., the co-used devices 104) with respect to the one or more events of the device 104.

Figure 5A:
FIGS. 5A to 5D illustrate example diagrams for determining correlations between one or more events of the device and the change in an ambience of the device, according to embodiments as disclosed herein.
Figure 5A:
Figure 5B:
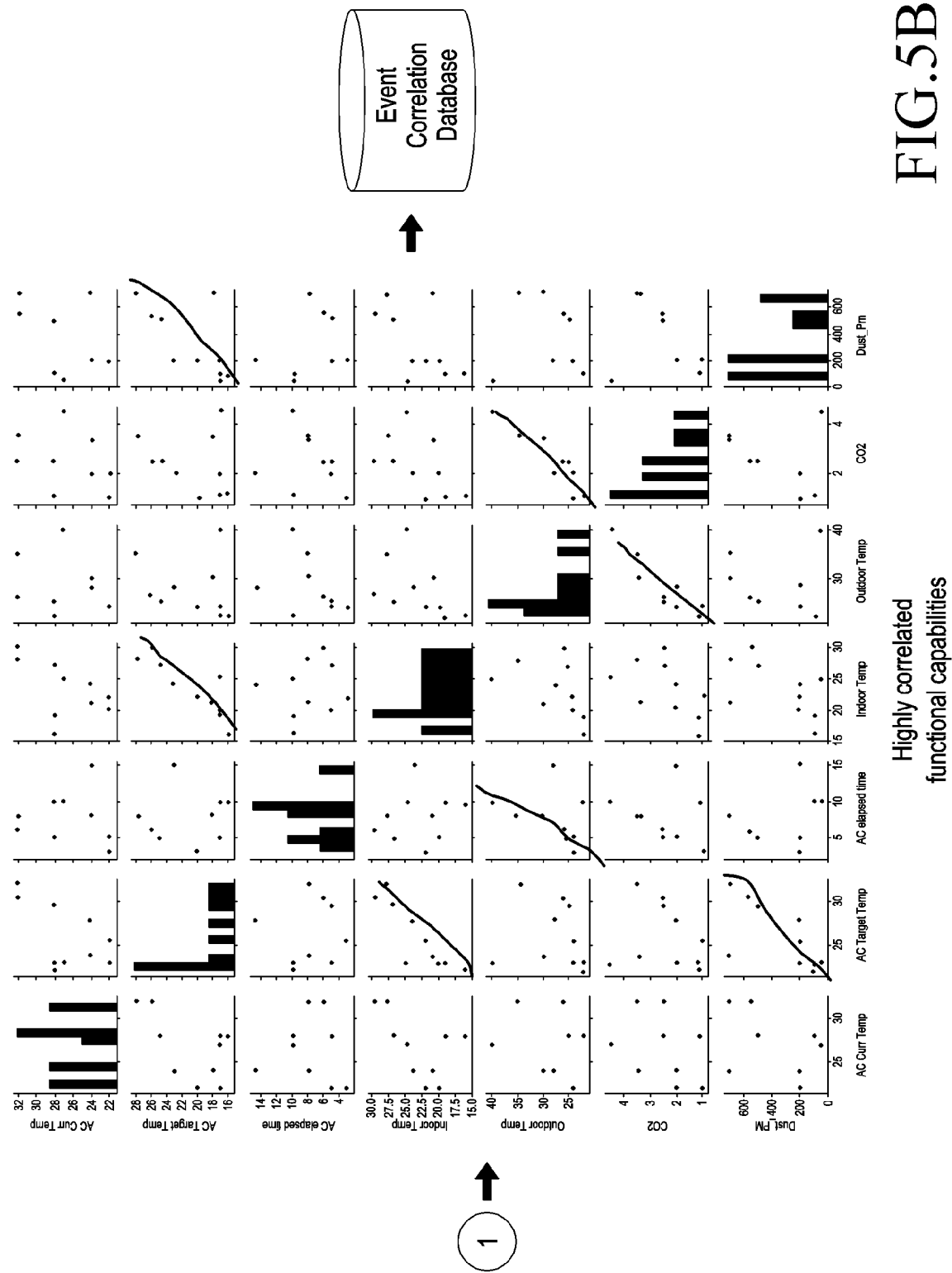

Consider an example scenario, as depicted in FIG. 5A and FIG. 5B, wherein the devices such as, but is not limited to, an indoor temperature sensor, a humidity sensor, a CO2 sensor, a dust sensor, and an outdoor sensor, and so on, may be the co-used devices 104 determined for an AC. In such a scenario, the correlation module 304 determines the correlation of each of the events (for example; changing temperature of a defined area in a fast cooling mode, normal mode, or the like) on the AC with the values of the functional capabilities of the AC, the indoor temperature sensor, the humidity sensor, the CO2 sensor, the dust sensor, and the outdoor sensor. For determining the correlation, the correlation module 304 access the state information of the AC, the indoor temperature sensor, the humidity sensor, the CO2 sensor, the dust sensor, and the outdoor sensor from the co-used devices event database 212. Based on the event data included in the received state information, the correlation module 304 determines the values of the functional capabilities of the AC, the indoor temperature sensor, the humidity sensor, the CO2 sensor, the dust sensor, and the outdoor sensor with respect to each event of the AC. The correlation module 304 performs the statistical correlation analysis on the values of functional capabilities of the AC and the co-used devices with respect to each event of the AC and determines the highly correlated functional capabilities for each event of the AC. An example visualization indicating results of the statistical correlation analysis performed on the functional capabilities of the AC and the co-used devices with respect to an example event (i.e., changing the temperature) of the AC is depicted in FIG. 5A and FIG. 5B. In the example visualization, straight lines may depict the highly correlated functional capabilities among the AC and the co-used devices 104 with respect to the events of the AC. In an example herein, the correlation module 304 may determine that the example event of changing the temperature may be highly correlated with an AC target temperature (an example functional capability of the AC) and the functional capabilities of the indoor temperature sensor and the dust sensor, compared to the other functional capabilities.

Figure 5C:
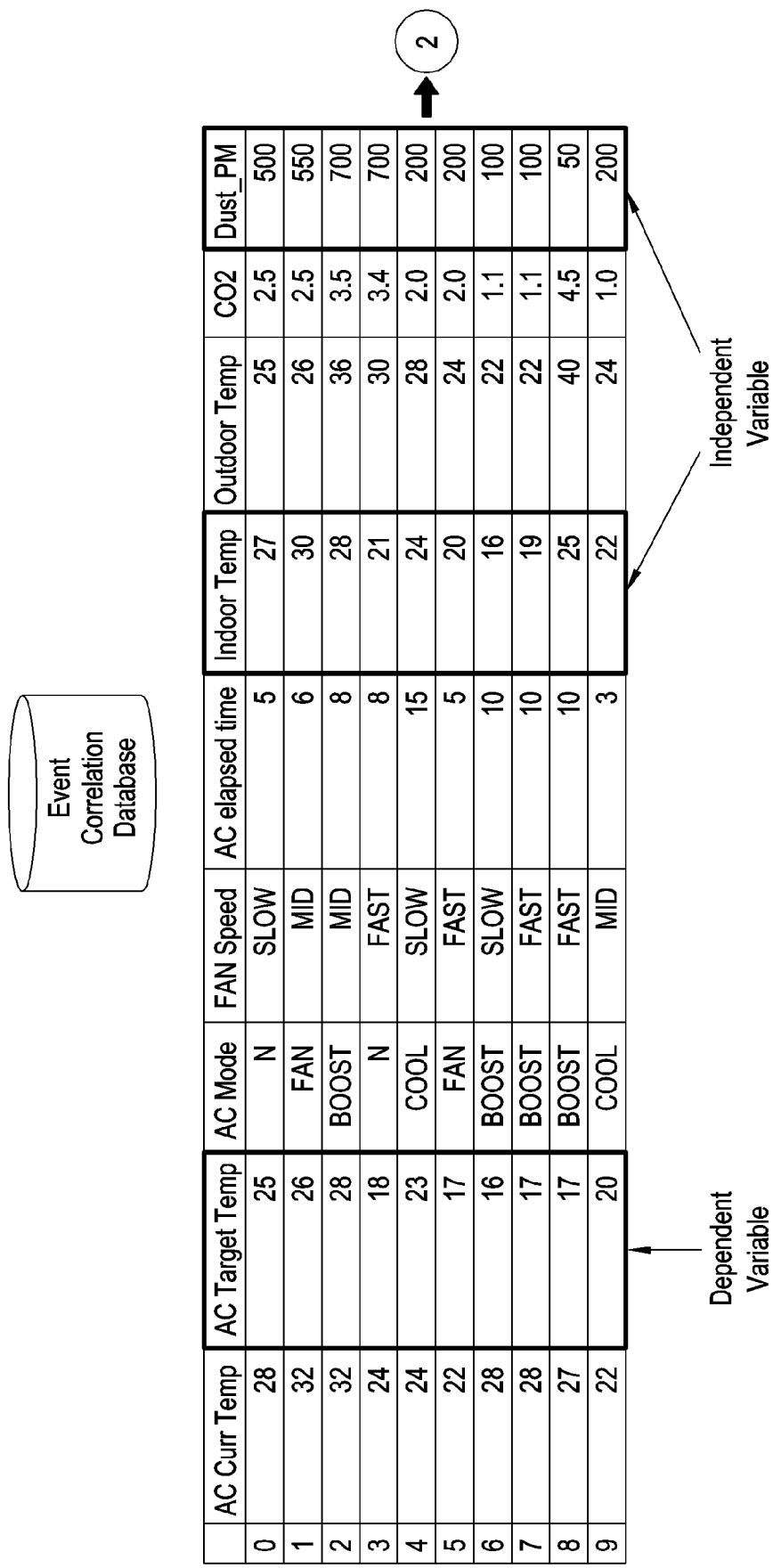
Figure 5D:
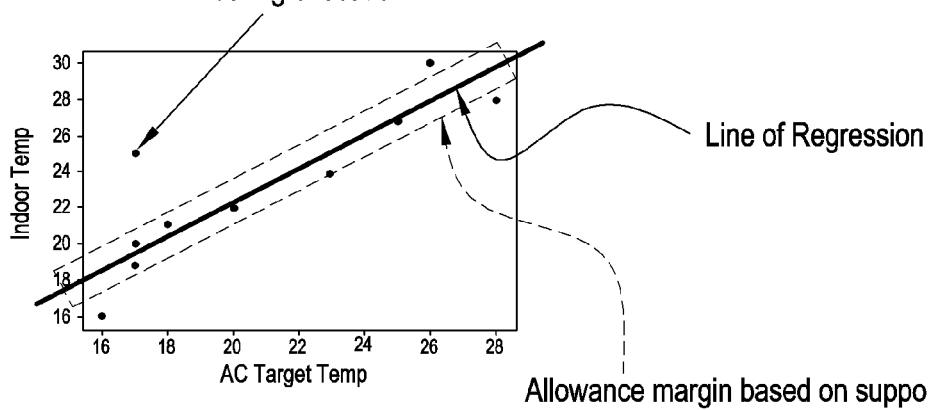
Figure 5D:
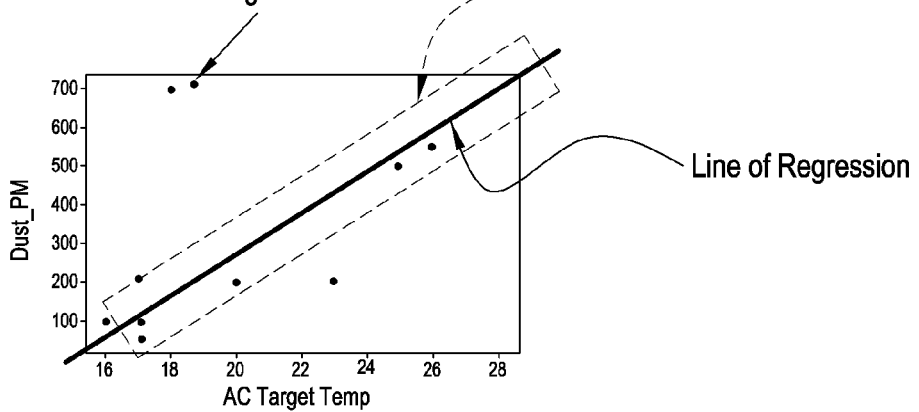

The correlation module 304 executes the linear regression with gradient descent method over the highly correlated functional capabilities and the manufacturer based predefined threshold limits of the functional capabilities of the AC and the co-used devices to determine the threshold of values of the functional capabilities of the AC, the indoor temperature sensor, the humidity sensor, the CO2 sensor, the dust sensor, and the outdoor sensor for each event of the AC. The threshold of values of the functional capabilities of the AC, the indoor temperature sensor, the humidity sensor, the CO2 sensor, the dust sensor, and the outdoor sensor with respect to each event of the AC may be used to detect the anomaly in the AC. In an example, the liner regression with gradient descent method executed over the functional capabilities of the indoor temperature sensor and the dust sensor with respect to the functional capabilities of the AC (i.e., the AC target temperature) is depicted in FIG. 5C and FIG. 5D. In an example; herein, the threshold of value of the AC target temperature (an example functional capability of the AC) determined by executing the linear regression with gradient descent method on the indoor temperature sensor or the dust sensor is represented using below equation:

$$AC_{target\_temp} = \Sigma y_i v_i + b$$

wherein, $AC_{target\_temp}$ represents the threshold of values of the AC target temperature (an example functional capability of the AC), '$y_i$' represents a regression co-efficient, '$v_i$' represents independent variables (in an example herein: the variables may be the values of the functional capabilities of the indoor temperature sensor and/or the dust sensor), and 'b' represents a bias. The bias may be a residual or estimated error, wherein the bias may be calculated by a derivation of dependent variables from a fitted linear regression equation. The correlation module 304 stores the coefficients/weights (for example: the regression coefficient) used to determine the threshold values of the functional capabilities of the AC, and the co-used devices for each event of the AC in the memory 202 or the IoT cloud server 102. In an embodiment, the correlation module 304 may use the weights/coefficients initialized by the electronic device 106 to determine the threshold values of the functional capabilities of the AC/device 104, and the co-used devices 104 for each event of the device 104. In another embodiment, the correlation module 304 may use the weights/coefficients used by the other devices (that is stored in the IoT cloud server 102) to determine the threshold values of the functional capabilities of the AC/device 104, and the co-used devices 104 for each event of the device 104. The weights/coefficients of the correlation module 304 may dynamically varied to determine the threshold values of the functional capabilities of the AC/device 104, and the co-used devices 104 for each event of the device 104 with improved accuracy.

The correlation module 304 performs the mapping of the threshold of values of the functional capabilities of the device 104 and the associated co-used devices 104 for each event of the device 104 and stores the mapping in the correlation event database 214.

The anomaly detection module 306 may be configured to detect the anomaly in the device 104 based on the correlation between the one or more events of the device 104 and the change in the ambience.

Consider an example scenario, wherein the anomaly detection module 306 detects the event occurred on an AC (an example of the device 104). On detecting the event on the AC, the anomaly detection module 306 determines the co-used devices 104 for example, but is not limited to, an indoor temperature and humidity sensor, and dust sensor, and so on for the AC, by accessing the co-used devices event database 212. The anomaly detection module 306 determines the values of the functional capabilities of the AC, the indoor temperature and humidity sensor, and the dust sensor with respect to the event occurred on the AC. The anomaly detection module 306 accesses the correlation event database 214 and fetches the threshold of values of the functional capabilities of the AC, the indoor temperature and humidity sensor and the dust sensor for the detected event of the AC. The anomaly detection module 306 compares the determined values of the functional capabilities of the AC, the indoor temperature and humidity sensor, and the dust sensor with the threshold of values of the functional capabilities of the AC, the indoor temperature and humidity sensor and the dust sensor. If any of the determined values of the functional capabilities of the AC, the indoor temperature and humidity sensor, and the dust sensor do not deviate beyond the threshold of values of the functional capabilities of the AC, the indoor temperature and humidity sensor and the dust sensor, the anomaly detection module 306 detects that the AC is functioning properly without anomalies. If any of the determined values of the functional capabilities of the AC, the indoor temperature and humidity sensor, and the dust sensor deviate beyond the threshold of values of the functional capabilities of the AC, the indoor temperature and humidity sensor and the dust sensor, the anomaly detection module 306 detects the anomaly in the AC.

On detecting the anomaly in the AC/device 104, the anomaly detection module 306 computes the deviation data or difference between the values of the functional capabilities of the device 104 and the co-used devices 104 and the respective threshold of values of functional capabilities. The anomaly detection module 306 also receives the data from the one or more sensors deployed in the IoT environment for monitoring the environment and processes the received data to determine the ambience environment input. The anomaly detection module 306 also accesses the anomaly mapping, the historical device health data, the manufacturer provided information, and so on from the device health knowledge base. The anomaly detection module provides at least one of, but is not limited to, the values of the functional capabilities of the device 104 and the associated co-used devices 104 with respect to the detected event, information about the detected anomaly, the deviation data, the anomaly mapping, the historical device health data, the manufacturer provided information, and so on, to the multi-class classifier module 308. Examples related to the real time data, the information about the detected anomaly, the historical device health information, and the ambient environment input are depicted in FIG. 6A to FIG. 6C.

The multi-class classifier module 308 may be configured to determine the one or more causes for the anomaly detected in the device 104. In an embodiment, the multi-class classifier module 308 may be an ensembled machine learning method, which uses multiple weak classifiers aimed at reducing error at each iterative step to determine the one or more causes for the anomaly detected in the device 104.

Figure 6A:
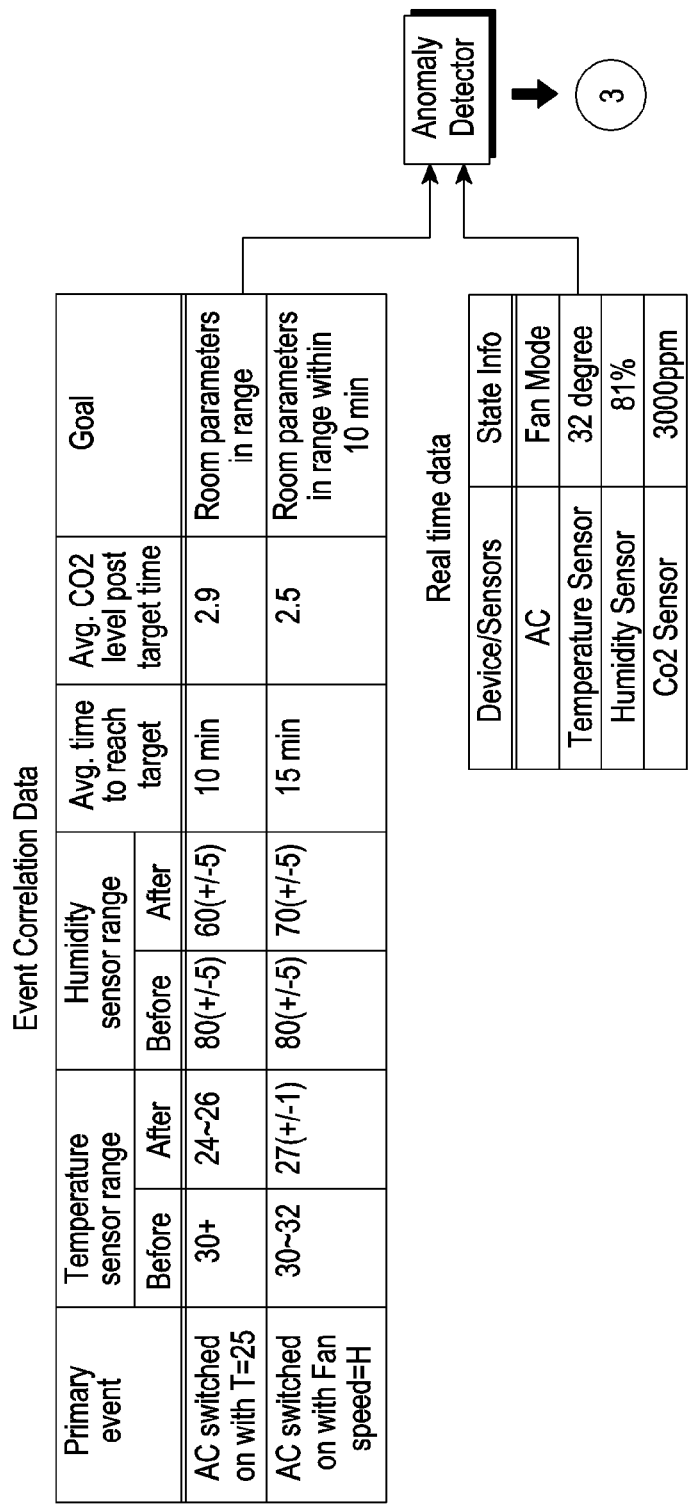
FIGS. 6A to 6C illustrate example diagrams for determining one or more root causes for one or more anomalies detected in the device, according to embodiments as disclosed herein.
Figure 6B:
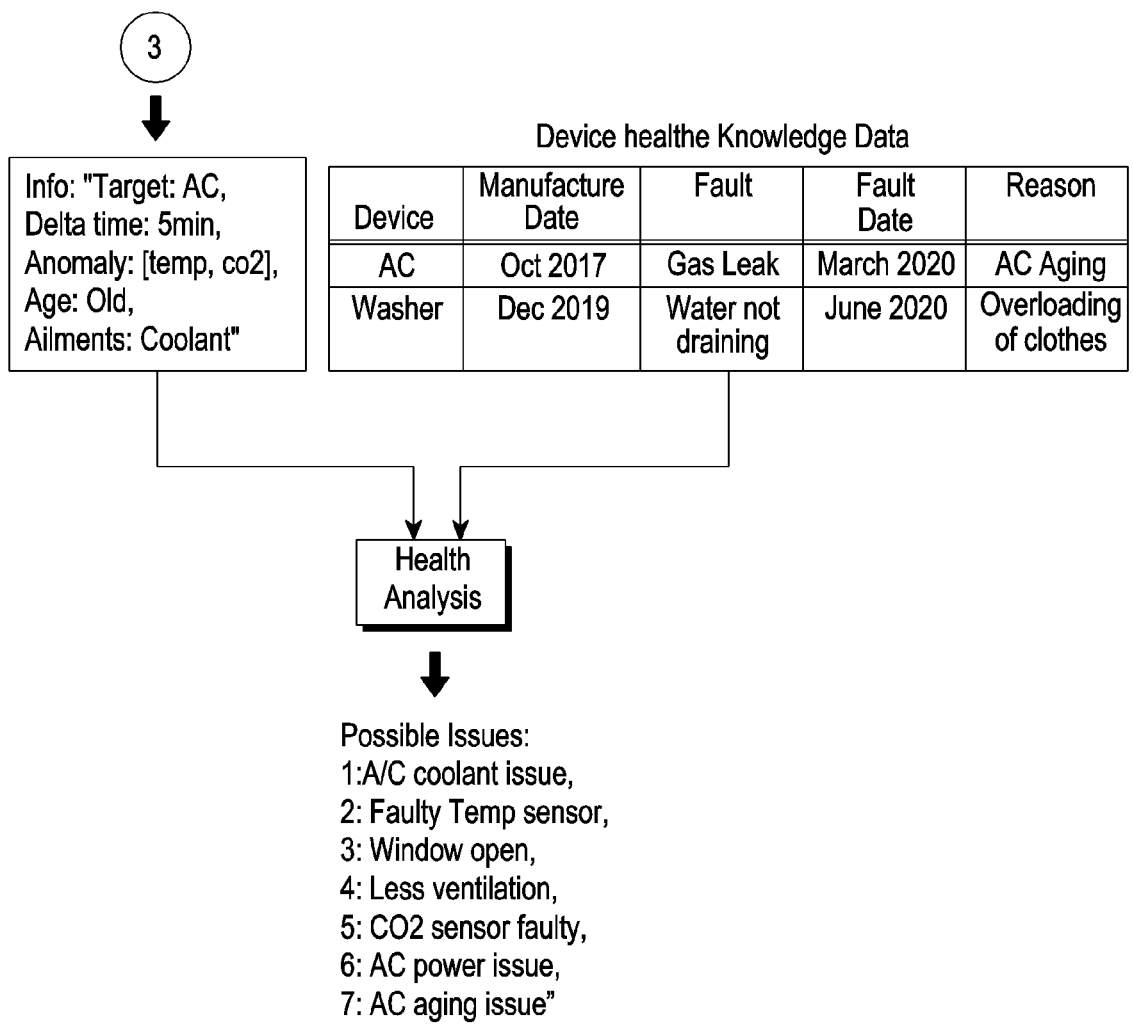
Figure 6C:
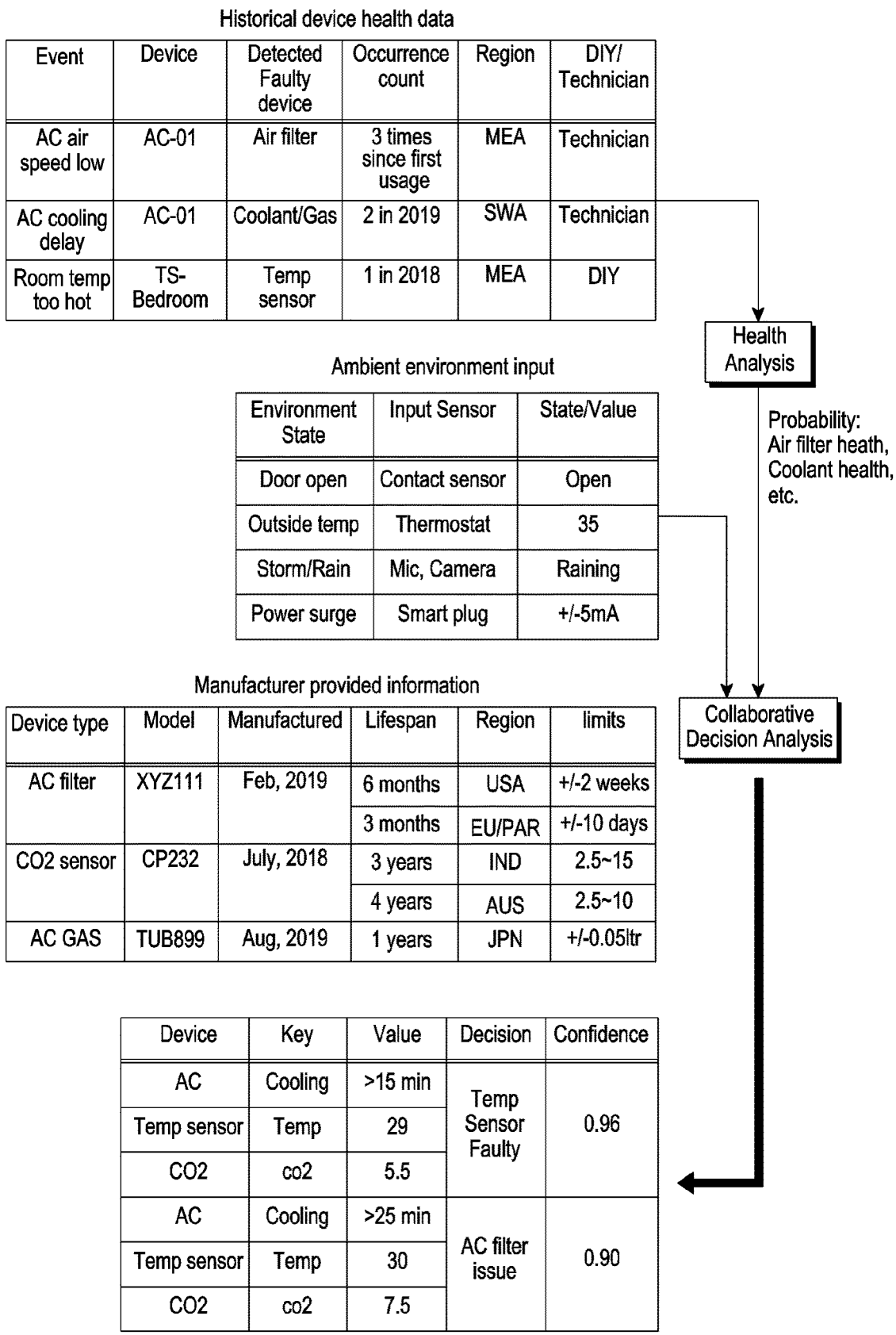

Consider an example scenario, as depicted in FIG. 6A to FIG. 6C, wherein the anomaly is detected in an AC. In such a scenario, the multi-class classifier module 308 may perform analysis on at least one of, but is not limited to, the real time data, the information about the detected anomaly, the historical device health information, the anomaly mapping, and the deviation/delta data (that have been received from the anomaly detection module 306) and generates the probable causes for the detected anomaly in the AC. The multi-class classifier module 308 further performs the collaborative decision analysis on the generated probable causes for the detected anomaly, the ambient environment input, and the manufacturer provided information (that have been received from the anomaly detection module 306) to determine the causes for the anomaly detected in the AC with the confidence scores. In an example, as depicted in FIG. 6B, the multi-class classifier module 308 may detect the causes such as, but are not limited to, a faulty temperature sensor with an example confidence score of 0.96, an AC filter issue with an example confidence score of 0.90, and so on. The multi-class classifier module 308 selects the one or more causes from the determined causes based on the confidence score of each cause, as the one or more causes of the anomaly detected in the AC. In an example, as depicted in FIG. 6B, the multi-class classifier module 308 may select the faulty temperature sensor as the cause for the anomaly in the AC.

The emotion and remedies deriving module 310 may be configured to derive the one or more emotions for the one or more causes of the anomaly detected in the device 104 and the one or more remedies to resolve the anomaly in the device 104.

Figure 7:
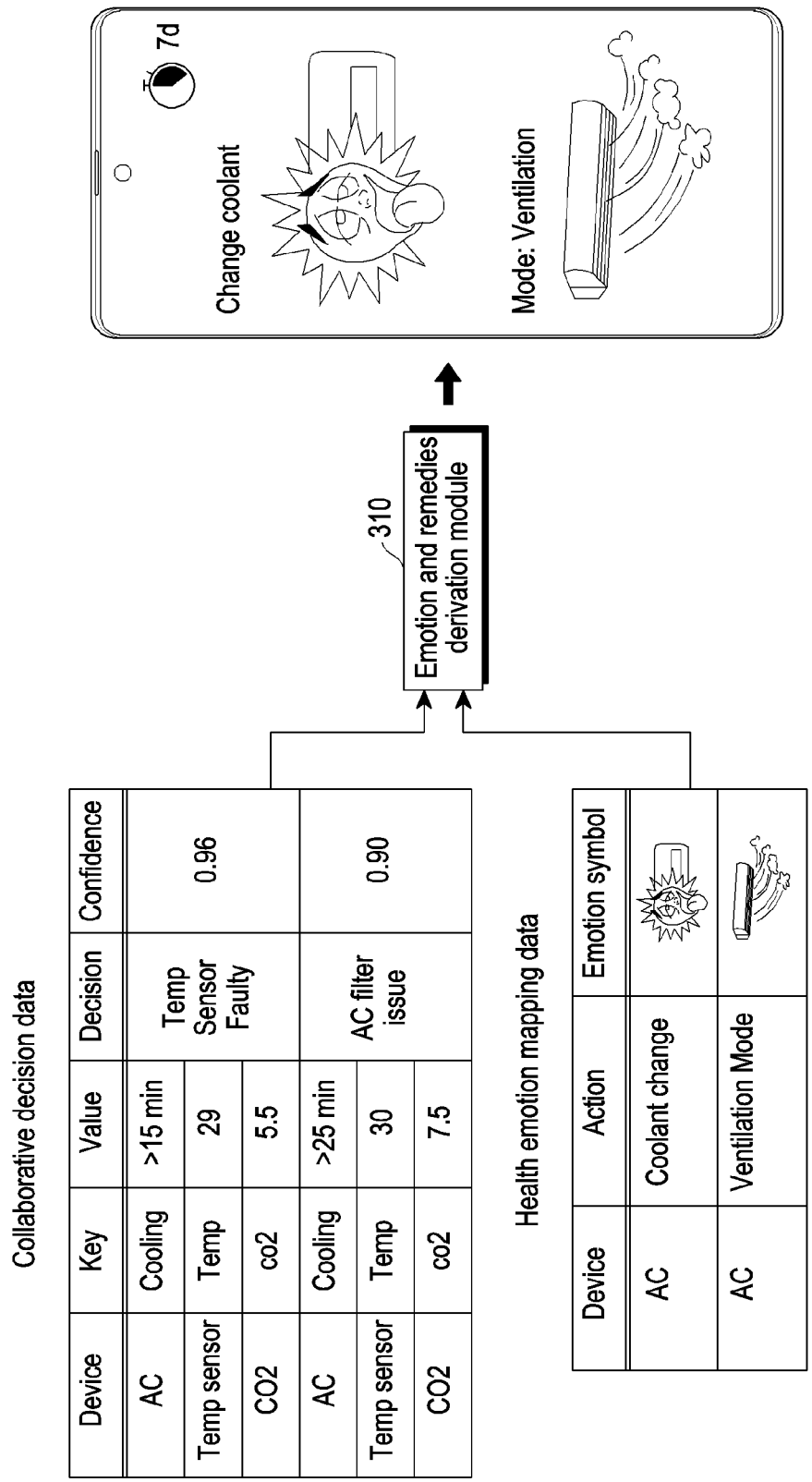
FIG. 7 illustrates an example diagram for deriving one or more emotions and one or more remedies for resolving the one or more anomalies in the device, according to embodiments as disclosed herein.

Consider an example scenario, as depicted in FIG. 7, wherein the emotion and remedies deriving module 310 receives information from the multi-class classifier module 308 indicating that a coolant issue and a ventilation mode are the causes for the anomaly in the AC. In such a scenario, the emotion and remedies deriving module 310 accesses the emotions and the remedies for the coolant issue and the ventilation mode from the emotion health mapper database 218. Example emotions depicting the coolant issue and the ventilation mode are depicted in FIG. 7. Examples of the remedies may be changing the coolant and changing a mode of operating the AC. The emotion and remedies deriving module 310 may recommend the derived remedies with the emotions to the user, so that the user may understand the cause of the anomaly and perform steps to resolve the anomaly in the device 104 based on the recommended remedies.

The feedback module 312 may be configured to determine the remedies/steps performed by the user to resolve the anomaly in the device 104. The feedback module 312 may provide information about the remedies/steps performed by the user to resolve the anomaly in the device 104 as the feedback to the correlation module 304 and the multi-class classifier module 308. The correlation module 304 may consider the feedback for determining the correlation between one or more future events of the device 104 and the change in ambience. The multi-class classifier module 308 may consider the feedback for determining the issues/causes with the improved confidence scores for future detected anomalies in the device 104. Thus, the anomalies of the devices 104 may detected with enhanced accuracy.

FIGS. 2 and 3 show exemplary blocks of the electronic device 106, but it is to be understood that other embodiments are not limited thereon. In other embodiments, the electronic device 106 may include more or less number of blocks. Further, the labels or names of the blocks are used only for illustrative purpose and does not limit the scope of the embodiments herein. One or more blocks can be combined together to perform same or substantially similar function in the electronic device 106.

Figure 8:
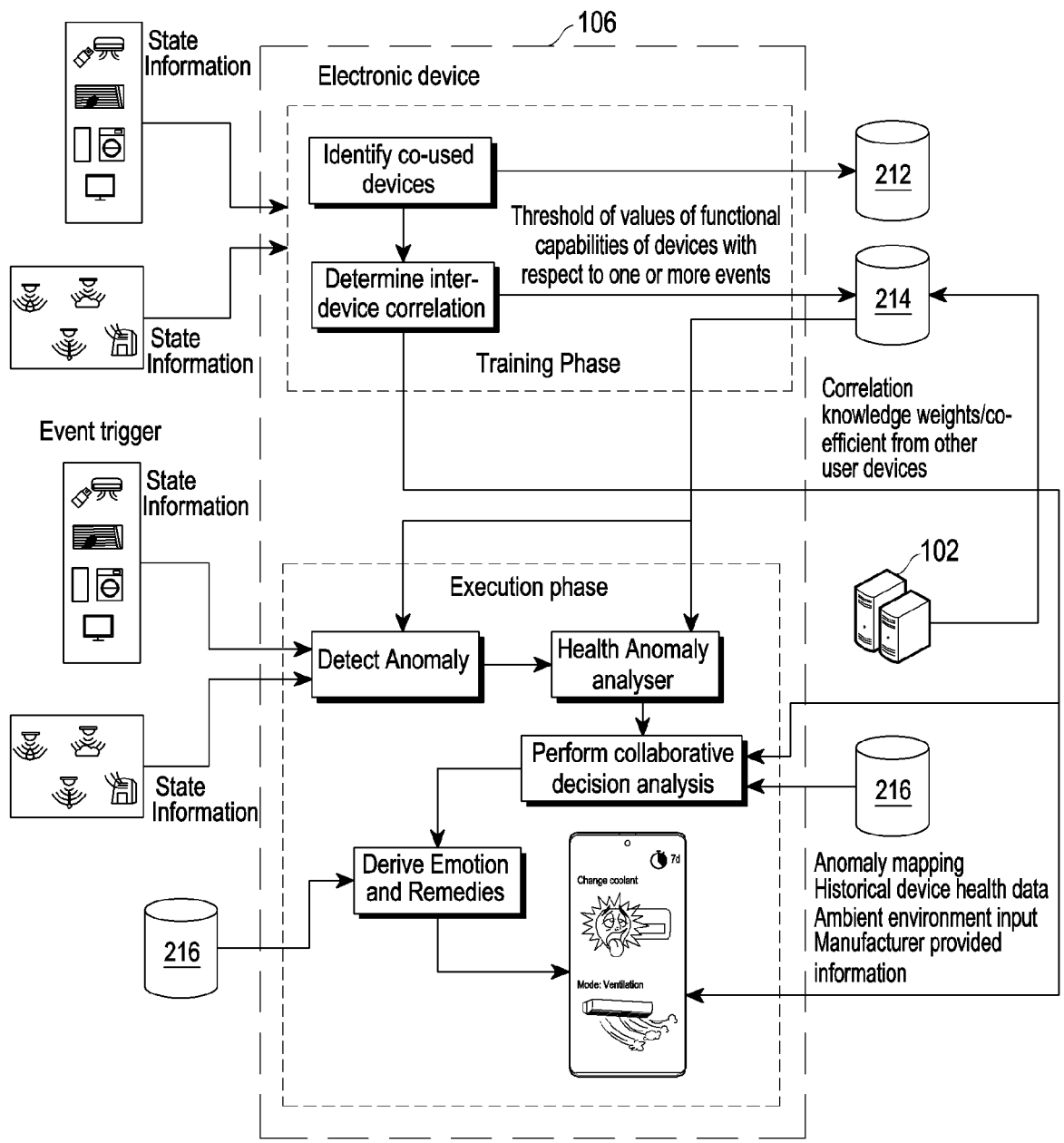
FIG. 8 illustrates an example conceptual diagram for managing the health of the device(s) in the IoT environment, according to embodiments as disclosed herein.

FIG. 8 is an example conceptual diagram depicting the management of the health of the device(s) in the IoT environment, according to embodiments as disclosed herein.

Embodiments herein enable the electronic device 106 to manage the health of the device(s) 104 in the IoT environment by determining the correlation between the devices 104 with respect to the one or more events on one of the devices 104 in the training phase, and receiving and processing in the execution phase, the real time data of the devices 104 based on the determined correlation to detect the anomaly in the device 104.

In the training phase, the electronic device 106 collects over the time, the state information from the devices 104 in the IoT environment. Based on the collected state information, the electronic device 106 determines the one or more events on the device 104 and the change in values of the functional capabilities of the other devices associated with the device 104 (that is the co-used devices 104) with respect to the one or more events on the device 104. The electronic device 106 performs the statistical analysis on the values of the functional capabilities of the device 104 and the co-used devices 104 with respect to the one or more events of the device 104 and determines the highly correlated functional capabilities of the co-used devices 104 with respect to the one or more events of the device 104. The electronic devices 106 analysis the determined highly correlated functional capabilities of the co-used devices 104 using the liner regression with gradient descent method and determines the threshold of values of the functional capabilities of the device 104 and the associated co-used devices 104 with respect to the one or more events of the device 104. The electronic device 106 performs the mapping of the threshold of values of the functional capabilities of the device 104 and the co-used devices 104 with respect to each event of the device 104 and stores the mapping in the correlation event database.

In the execution phase, the electronic device 106 detects the event on the device 104. The electronic device 106 determines the value of the functional capabilities of the device 104 and the co-used devices 104 with respect to the detected event on the device 104. The electronic device 106 compares the determined values of the functional capabilities of the device 104 and the co-used device 104 with the stored threshold of values of the functional capabilities of the device 104 and the co-used devices 104 in the correlation event database 214 for the detected event. If the determined values of the functional capabilities of the device 104 and the co-used device 104 do not beyond the threshold of values of the functional capabilities of the device 104 and the co-used devices 104, the electronic device 106 detects zero anomalies/faults in the device 104. If any of the determined values of the functional capabilities of the device 104 and the co-used device 104 deviate beyond the threshold of values of the functional capabilities of the device 104 and the co-used devices 104, the electronic device 106 detects the anomaly/fault in the device 104.

On detecting the anomaly in the device 104, the electronic device 106 determines the root cause/issue associated with the detected anomaly. The electronic device 106 determines the root cause for the anomaly based on the determined values of the functional capabilities of the device 104 and the associated co-used devices 104 with respect to the monitored event (the real time data), the deviation data, the anomaly mapping, the historical device health database, the ambient environment input, the manufacturer provided issue information, and so on.

On determining the root cause for the anomaly detected in the device 104, the electronic device 106 derives the emotion for illustrating/depicting the determined root cause and the one or more remedies for resolving the detected anomaly in the device 104. The electronic device 106 recommends the derived one or more remedies with the emotion to the user for understanding and resolving the anomaly in the device 104. The electronic device 106 also performs a continuous polling to check if the user has taken any of the recommend remedies to resolve the anomaly in the device 104, which aids the electronic device 106 in detecting the anomaly and recommending the remedies in future.

Figure 9:
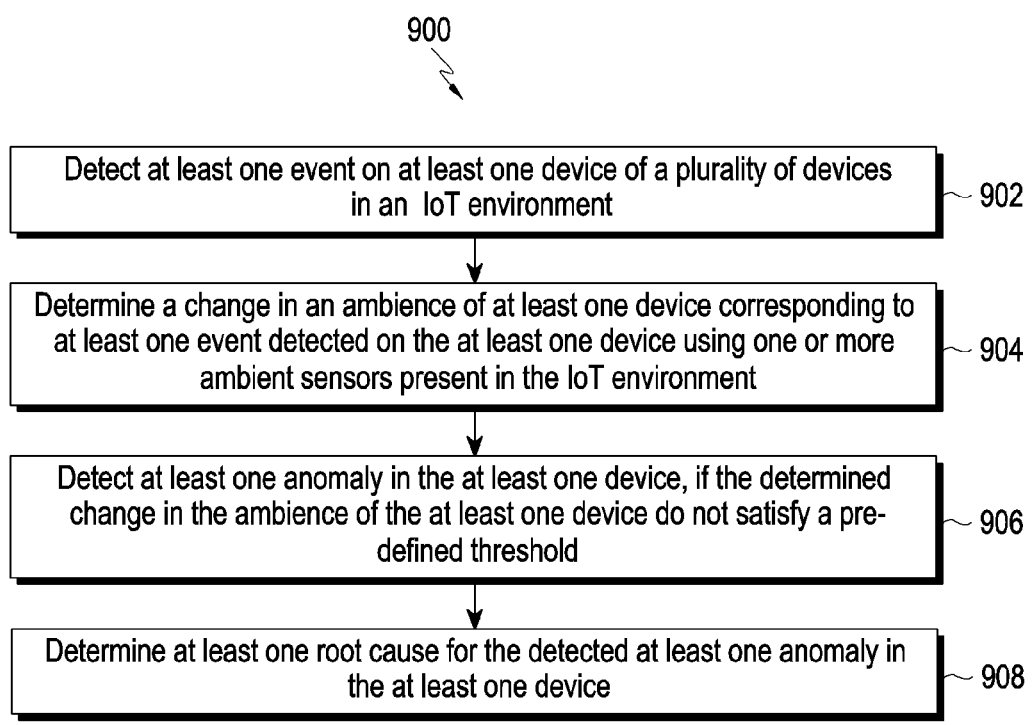
FIG. 9 illustrates a flow diagram depicting a method for managing the health of the device(s) in the IoT environment, according to embodiments as disclosed herein.

FIG. 9 is a flow diagram depicting a method 900 for managing the health of the device(s) 104 in the IoT environment, according to embodiments as disclosed herein.

At step 902, the method includes detecting, by the electronic device 106, the at least one event on the at least one device 104 of the plurality of devices 104 present in the IoT environment. At step 904, the method includes determining, by the electronic device 106, the change in the ambience of the at least one device 104 corresponding to the at least one event detected on the at least one device 104 using the one or more ambient sensors present in the IoT environment. The ambience of the at least one device 104 includes the at least one co-used device 104 that operate simultaneously with the at least one device 104 and establish a relationship with the at least one event of the at least one device 104. The change in the ambience of the at least one device 104 corresponds to the change in at least one event of the at least one co-used device 104 due to the at least one event detected on the at least one device 104.

At step 906, the method includes detecting, by the electronic device 106, the at least one anomaly in the at least one device 104, if the determined change in the ambience of the at least one device 104 does not satisfy threshold criteria determined for the detected at least one event of the at least one device 104. The threshold criteria include the threshold of at least one value of the at least one functional capability of the at least one device 104 and the associated at least one co-used device 104 with respect to each event of the plurality of events of the at least one device 104.

At step 908, the method includes determining, by the electronic device 106, the at least one root cause for the detected at least one anomaly in the at least one device 104. The various actions in method 900 may be performed in the order presented, in a different order or simultaneously. Further, in some embodiments, some actions listed in FIG. 9 may be omitted.

Figure 10:
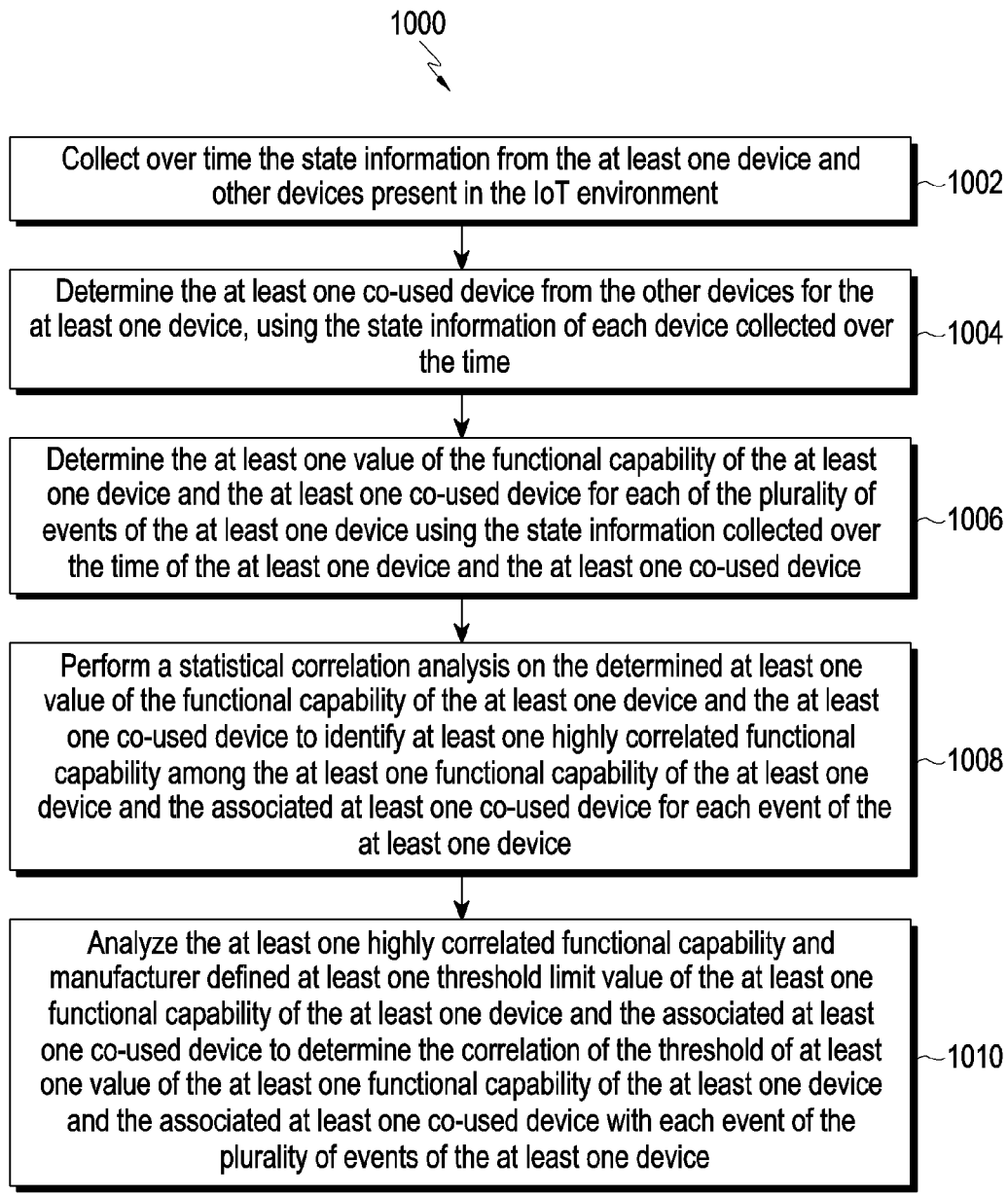
FIG. 10 illustrates a flow diagram depicting a method for determining the correlation between the devices with respect to each event on any one of the devices, according to embodiments as disclosed herein.

FIG. 10 is a flow diagram depicting a method 1000 for determining the correlation between the devices 104 with respect to each event on any one of the devices 104, according to embodiments as disclosed herein.

At step 1002, the method includes collecting over time, by the electronic device 106, the state information from the at least one device 104 and other devices 104 present in the IoT environment. At step 1004, the method includes determining, by the electronic device 106, the at least one co-used device 104 from the other devices 104 for the at least one device 104, using the state information of each device 104 collected over the time. For determining the at least one co-used device 104 for the device 104, the electronic device determines the at least one event and associated time data of the at least one device 104 and the other devices 104 from the state information received from each device 104. The electronic device 106 divides the at least one event of the at least one device 104 and the other devices 104 into at least one timeslot. The electronic device 106 generates the at least one transaction data by grouping the at least one event associated with the at least one same timeslot, wherein each transaction includes the at least one event, the at least one device 104 and at least one other device 104 associated with the at least one event. The electronic device 106 determines the at least one co-used device 104 from the other devices 104 for the at least one device 104, by analyzing the at least one transaction data using the pattern mining method.

At step 1006, the method includes, determining, by the electronic device 106, the values of the functional capabilities of the at least one device 104 and the at least one co-used device 104 with respect to each event of the at least one device 104.

At step 1008, the method includes, performing, by the electronic device 106, the statistical correlation analysis on the values of the functional capabilities of the at least one device 104 and the at least one co-used device 104 with respect to each event of the at least one device 104 to determine the at least one highly correlated functional capability among the at least one functional capability of the at least one device 104 and the associated at least one co-used device 104 for each event of the plurality of events of the at least one device 104.

At step 1010, the method includes analyzing, by the electronic device 106, the at least one highly correlated functional capability and the manufacturer defined at least one threshold limit value of the at least one functional capability of the at least one device 104 and the associated at least one co-used device 104 to determine the correlation of the threshold of at least one value of the at least one functional capability of the at least one device 104 and the associated at least one co-used device 104 with respect to each event of the plurality of events of the at least one device 104. The electronic device 106 uses the linear regression with gradient descent method to determine the correlation of the threshold of at least one value of the at least one functional capability of the at least one device 104 and the associated at least one co-used device 104 with respect to each event of the plurality of events of the at least one device 104. The electronic device 106 stores the threshold of at least one value of the at least one functional capability of the at least one device 104 and the associated at least one co-used device 104 with respect to each event of the plurality of events of the at least one device 104 in the correlation event database 214. The various actions in method 1000 may be performed in the order presented, in a different order or simultaneously. Further, in some embodiments, some actions listed in FIG. 10 may be omitted.

Figure 11:
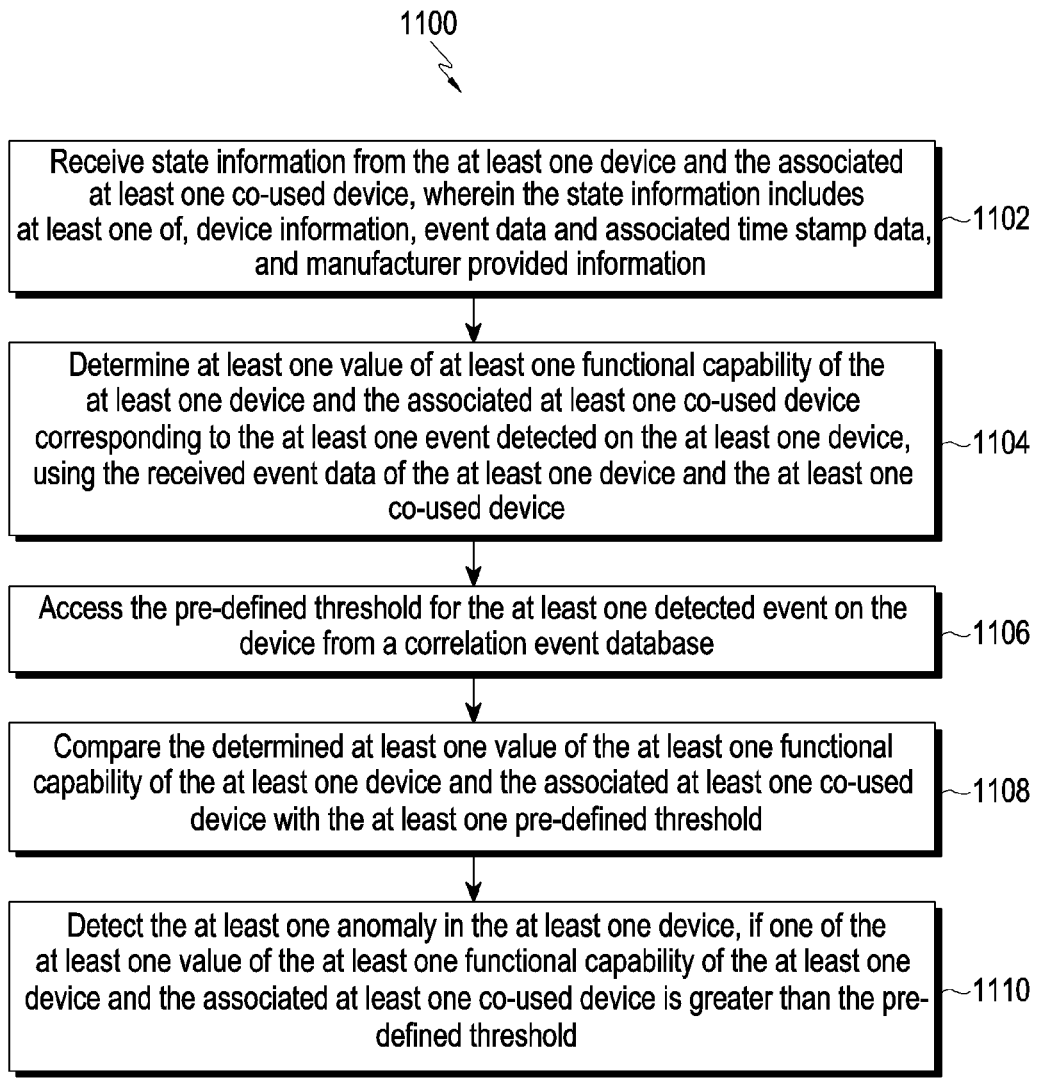
FIG. 11 illustrates a flow diagram depicting a method for detecting the anomaly in the device, according to embodiments as disclosed herein.

FIG. 11 is a flow diagram depicting a method 1100 for detecting the anomaly in the device 104, according to embodiments as disclosed herein.

At step 1102, the method includes receiving, by the electronic device 106, the state information from the at least one device 104 and the associated at least one co-used device 104, wherein the state information includes at least one of, the device information, the event data and associated time stamp data, and manufacturer provided information.

At step 1104, the method includes determining, by the electronic device 106, the at least one value of at least one functional capability of the at least one device 104 and the associated at least one co-used device 104 corresponding to the at least one event detected on the at least one device 104, using the received event data of the at least one device 104 and the at least one co-used device 104.

At step 1106, the method includes accessing, by the electronic device 106, the threshold criteria determined for the at least one detected event on the device 104 from the correlation event database 214. At step 1108, the method includes comparing, by the electronic device 106, the determined at least one value of the at least one functional capability of the at least one device 104 and the associated at least one co-used device 104 with the threshold criteria. At step 1110, the method includes detecting, by the electronic device 106, the at least one anomaly in the at least one device 104, if one of the at least one value of the at least one functional capability of the at least one device 104 and the associated at least one co-used device 104 is greater than the threshold criteria. The various actions in method 1100 may be performed in the order presented, in a different order or simultaneously. Further, in some embodiments, some actions listed in FIG. 11 may be omitted.

Figure 12:
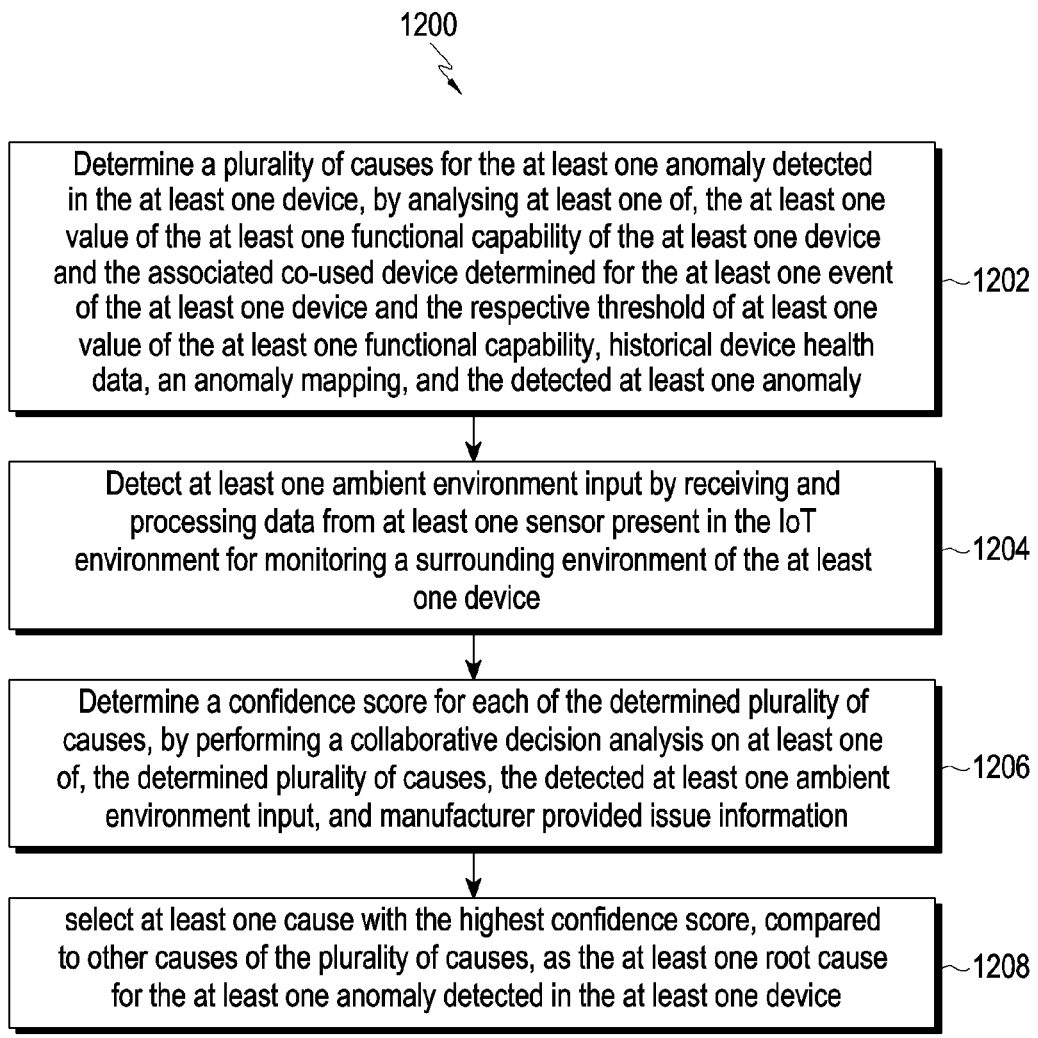
FIG. 12 illustrates a flow diagram depicting a method for determining the at least one root cause for the anomaly detected in the device, according to embodiments as disclosed herein.

FIG. 12 is a flow diagram depicting a method 1200 for determining the at least one root cause for the anomaly detected in the device 104, according to embodiments as disclosed herein.

At step 1202, the method includes determining, by the electronic device 106, the plurality of causes for the at least one anomaly detected in the at least one device 104, by analyzing at least one of, the at least one value of the at least one functional capability of the at least one device 104 and the associated co-used device 104 determined for the at least one event of the at least one device 104 and the respective threshold of at least one value of the at least one functional capability, the historical device health data, the anomaly mapping, the detected at least one anomaly, but is not limited thereto.

At step 1204, the method includes detecting, by the electronic device 106, the at least one ambient environment input by receiving and processing the data from the at least one sensor present in the IoT environment for monitoring the surrounding environment of the at least one device 104. At step 1206, the method includes determining, by the electronic device 106, the confidence score for each of the determined plurality of causes, by performing the collaborative decision analysis on at least one of, the determined plurality of causes, the detected at least one ambient environment input, the manufacturer provided issue information, but is not limited thereto.

At step 1208, the method includes selecting, by the electronic device 106, the at least one cause with the highest confidence score, compared to other causes of the plurality of causes, as the at least one root cause for the at least one anomaly detected in the at least one device 104. The various actions in method 1200 may be performed in the order presented, in a different order or simultaneously. Further, in some embodiments, some actions listed in FIG. 12 may be omitted.

Figure 13:
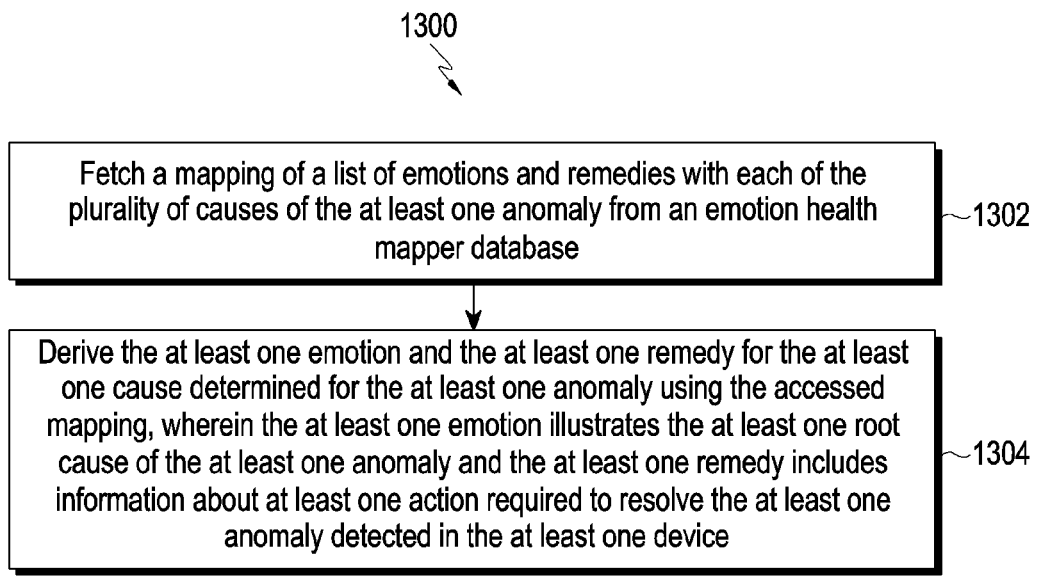
FIG. 13 illustrates a flow diagram depicting a method for deriving the emotion and the one or more remedies for the anomaly detected in the device, according to embodiments as disclosed herein.

FIG. 13 is a flow diagram depicting a method 1300 for deriving the emotion and the one or more remedies for the anomaly detected in the device 104, according to embodiments as disclosed herein.

At step 1302, the method includes fetching, by the electronic device 106, the mapping of the emotions and remedies with each of the plurality of causes of the at least one anomaly from the emotion health mapper database 218.

At step 1304, the method includes deriving, by the electronic device 106, the at least one emotion and the at least one remedy for the at least one cause determined for the at least one anomaly using the accessed mapping, wherein the at least one emotion illustrates the at least one root cause of the at least one anomaly and the at least one remedy includes information about at least one action to be performed for resolving the at least one anomaly detected in the at least one device 104. The various actions in method 1300 may be performed in the order presented, in a different order or simultaneously. Further, in some embodiments, some actions listed in FIG. 13 may be omitted.

Figure 14A:
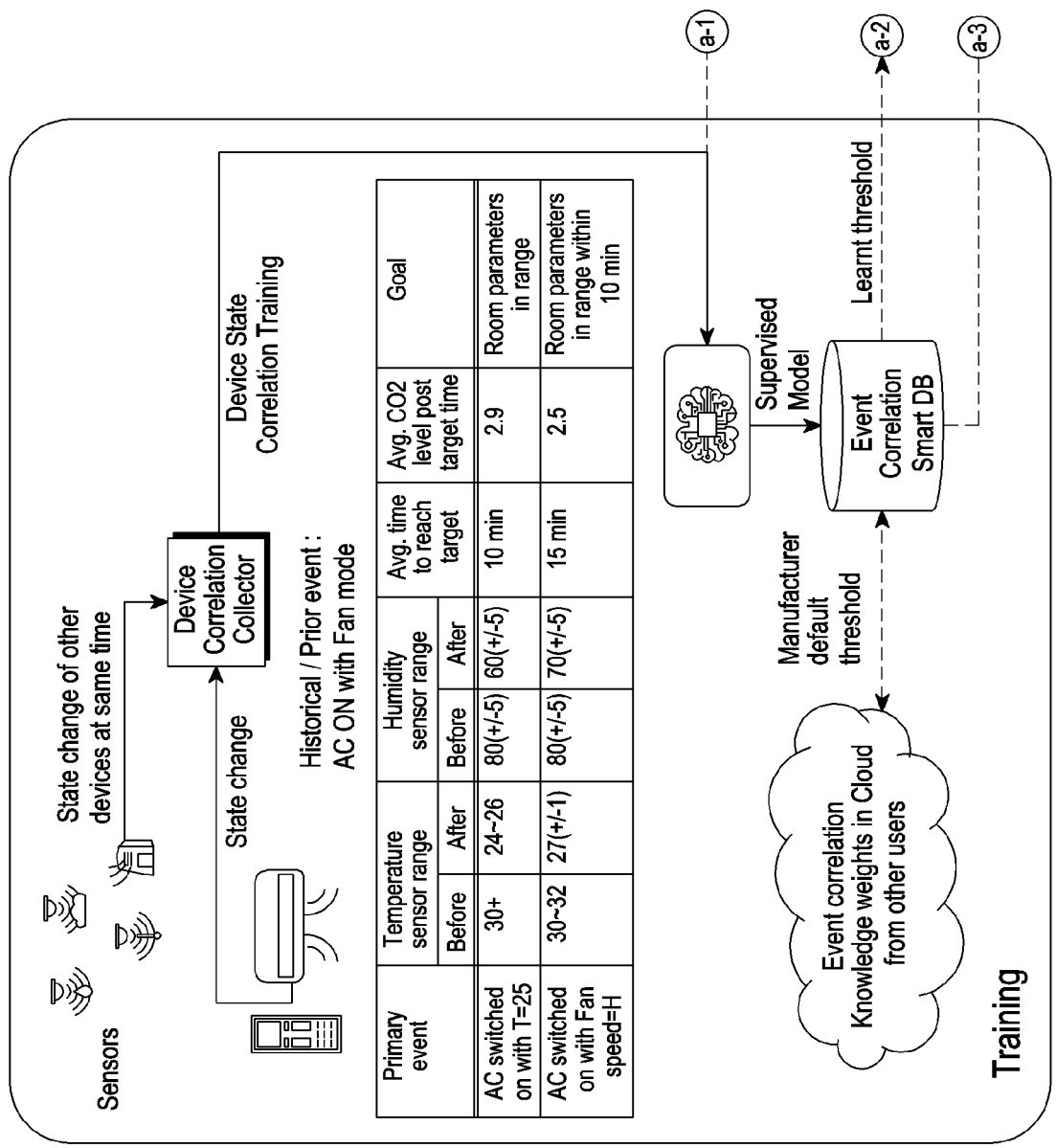
FIGS. 14A to 14F illustrate example diagrams depicting use case scenarios of managing the health of the devices in the IoT environment, according to embodiments as disclosed herein.
Figure 14B:
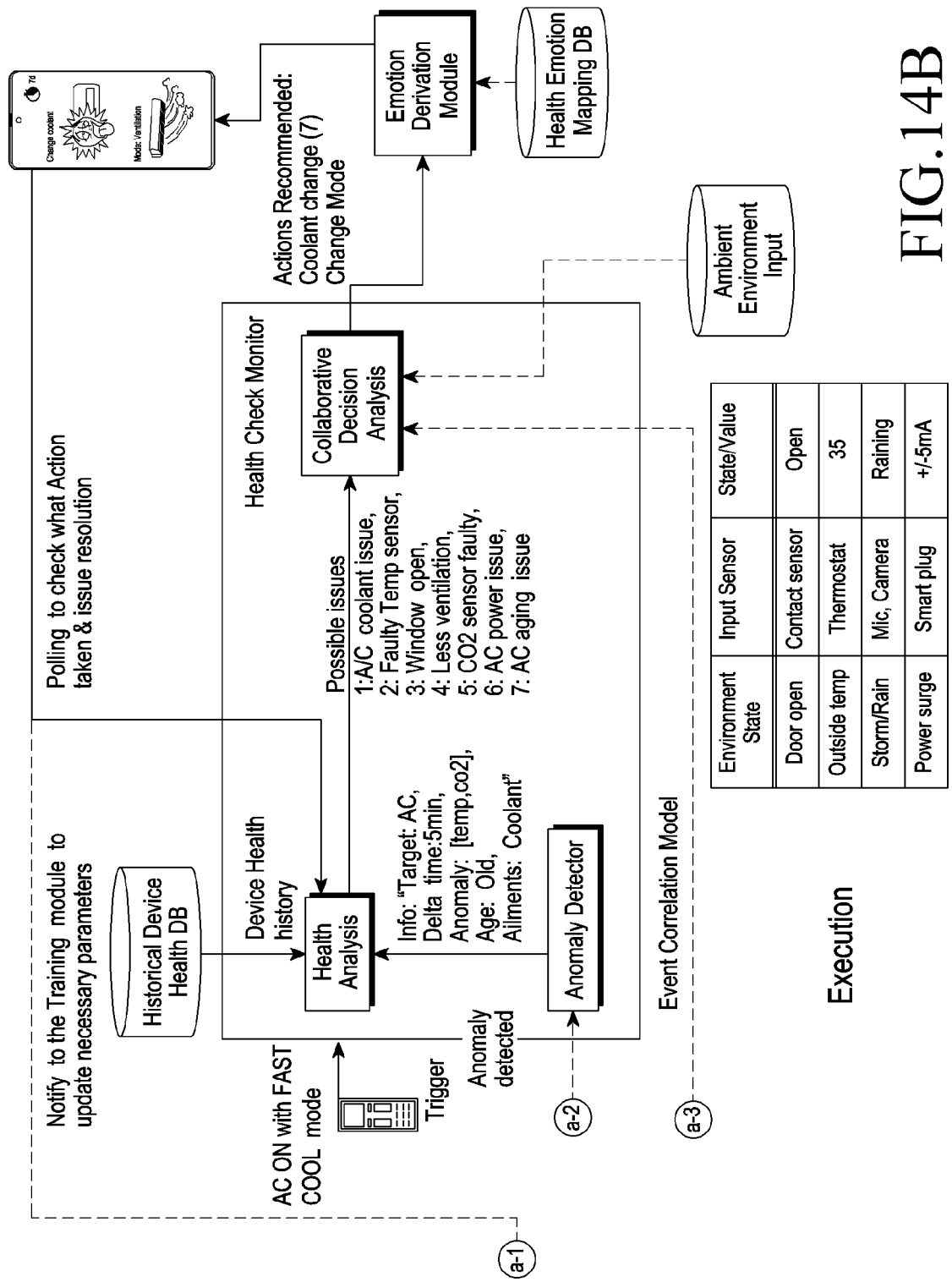
Figure 14C:
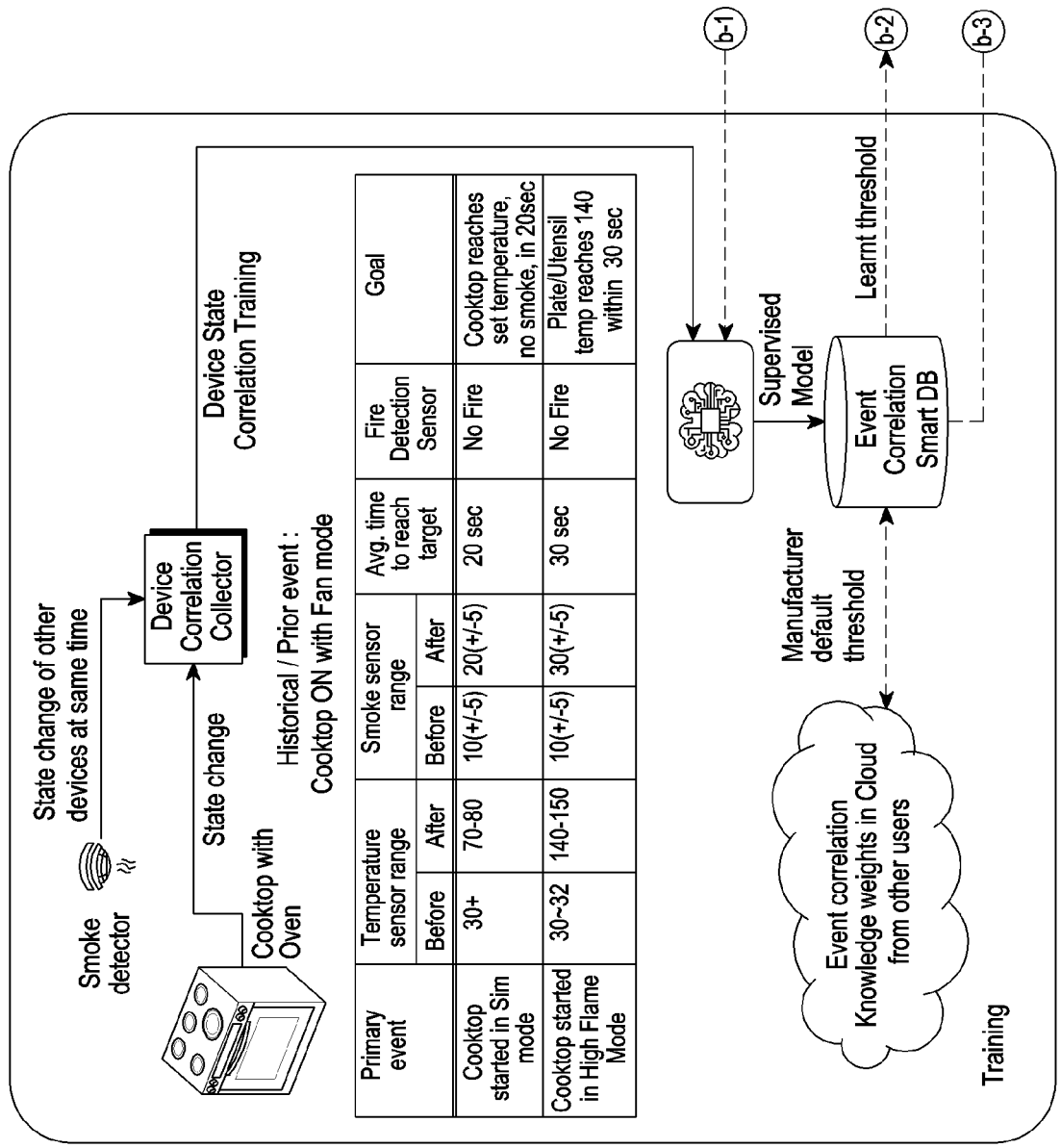
Figure 14D:
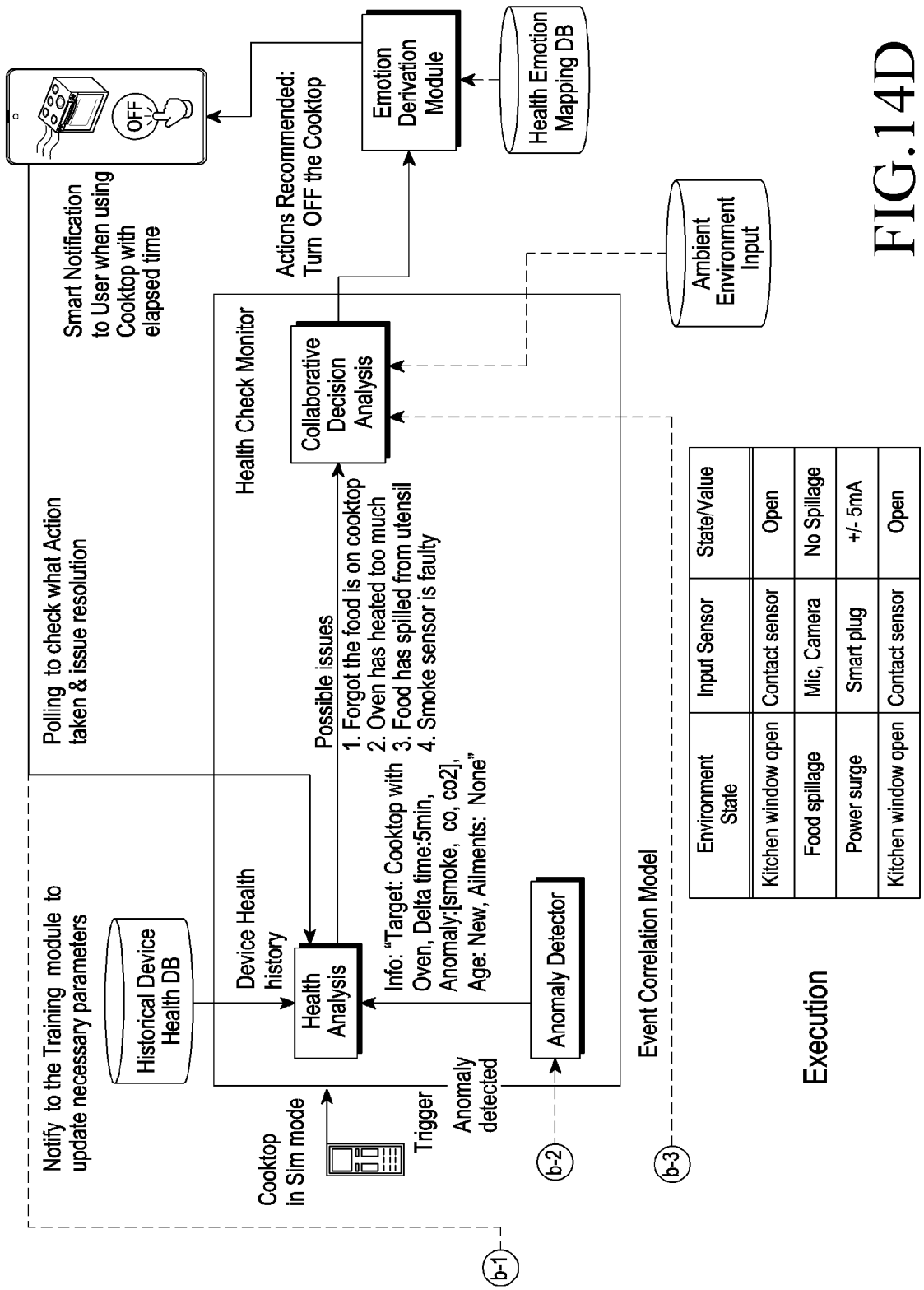
Figure 14E:
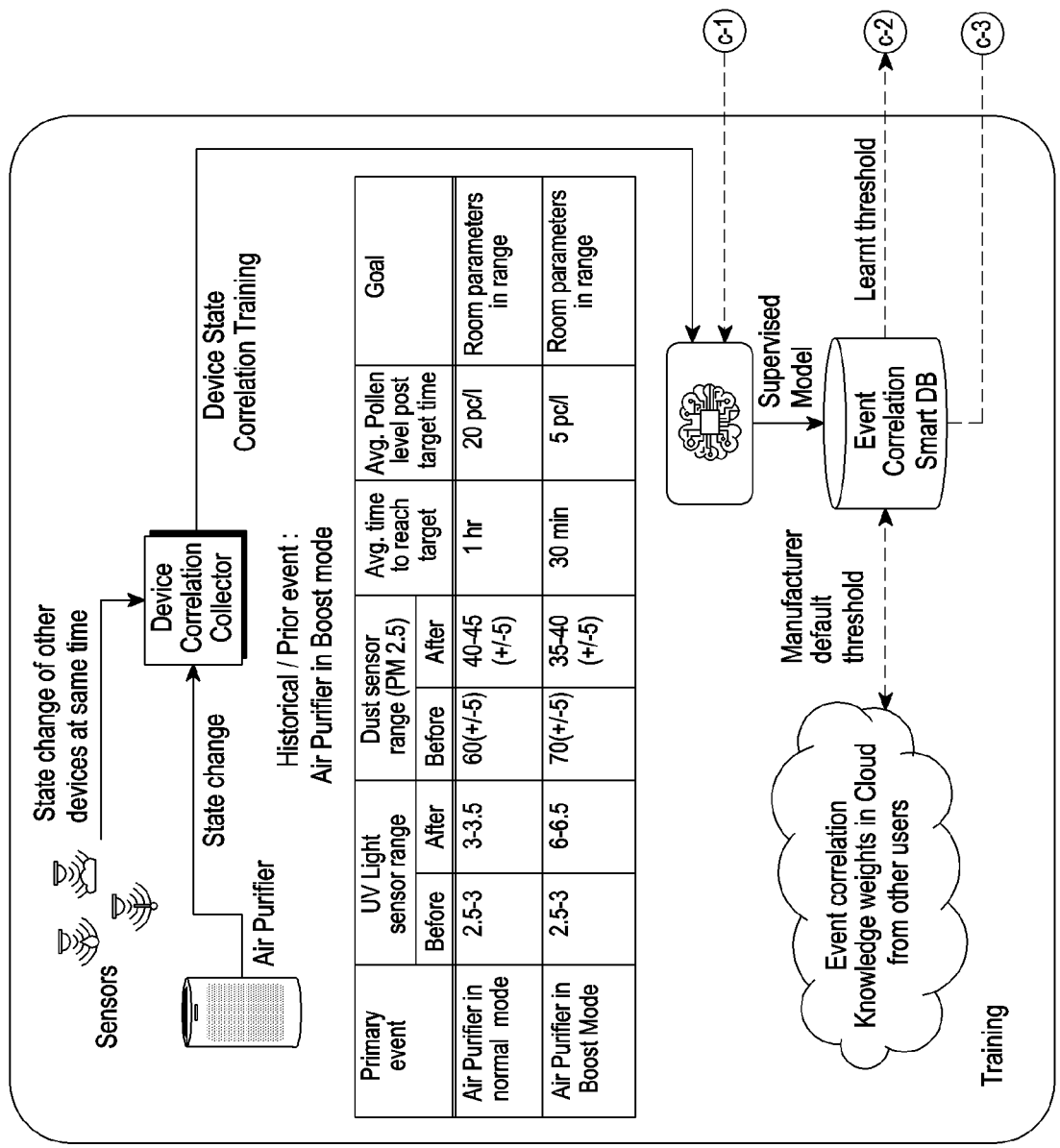
Figure 14F:
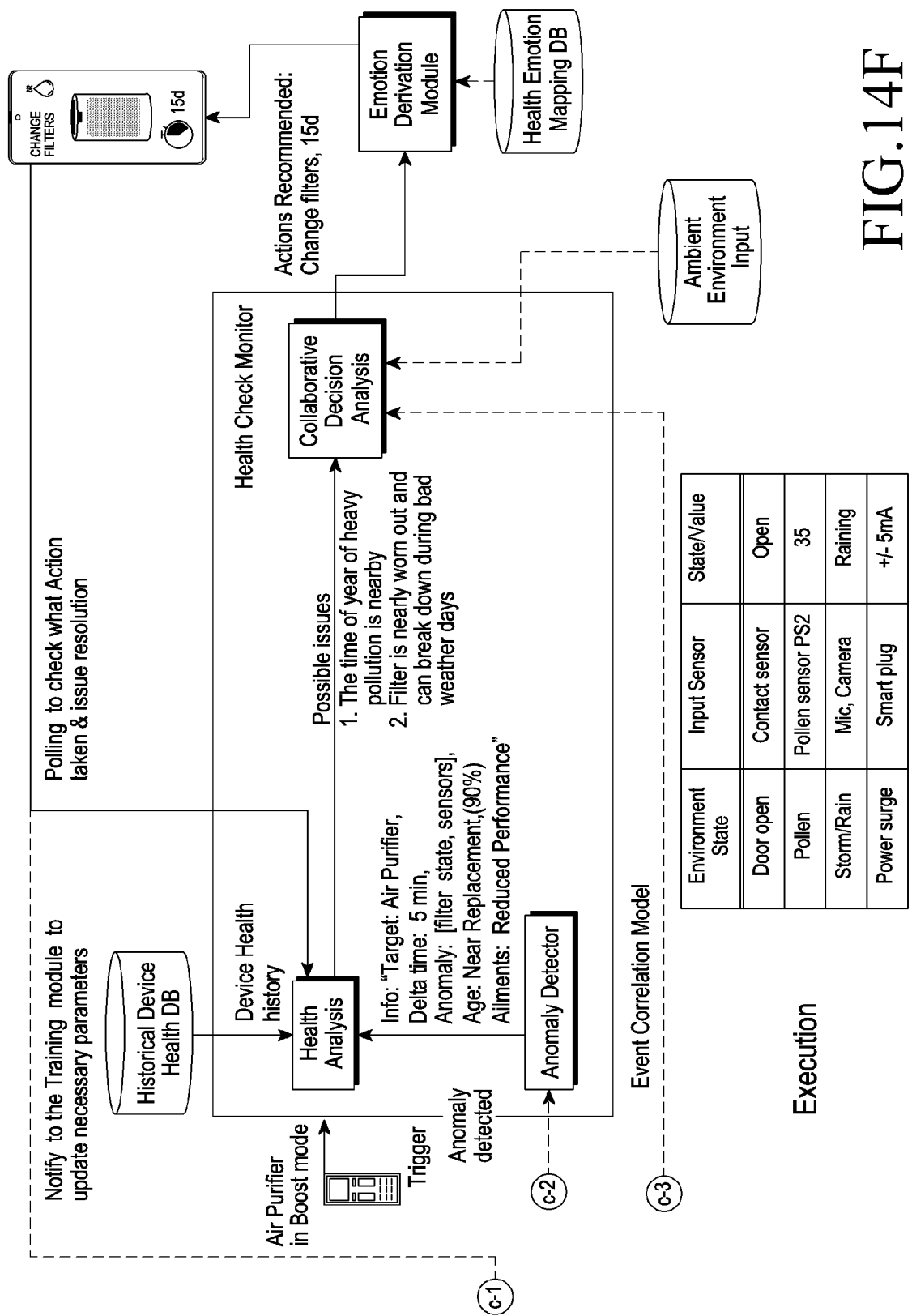

FIGS. 14A, to 14F are example diagrams depicting use case scenarios of managing the health of the devices 104 in the IoT environment, according to embodiments as disclosed herein.

Consider an example scenario, as depicted in FIG. 14A to FIG. 14F, wherein the electronic device 106 manages the health of an AC (an example of the device 104). For managing the health of the AC, the electronic device 106 determines the devices 104, such as, but are not limited to, an indoor temperature sensor, a humidity sensor, a $CO_2$ sensor, and so on, as the co-used devices 104 for the AC, based on their historical/previous state information (i.e., the state information collected over time). The electronic device 106 further analyzes the historical/previous state information (i.e., the state information collected over time) of the AC, the indoor temperature sensor, the humidity sensor, and the $CO_2$ sensor and determines the correlation of the one or more events of the AC (for example: switching ON the AC with an example temperature T=25, switching ON the AC with fast cooling mode/fan speed mode, or the like) with the threshold of values of the functional capabilities of the AC, the indoor temperature sensor, the humidity sensor, and the $CO_2$ sensor. The threshold of values of the functional capabilities of the AC, the indoor temperature sensor, the humidity sensor, and the $CO_2$ sensor with respect to each event of the AC indicate the allowable values for the corresponding event (beyond which the anomaly may be detected). The electronic device 106 performs the mapping of the threshold of values of the functional capabilities of the AC, the indoor temperature sensor, the humidity sensor, and the $CO_2$ sensor with respect to each event of the AC and stores the mapping in the correlation event database 214.

The electronic device 106 detects an example event of switching ON the AC in the fast cooling mode. In such a scenario, the electronic device 106 determines the values of the functional capabilities of the AC, the indoor temperature sensor, the humidity sensor, and the $CO_2$ sensor (the co-used devices) with respect to the detected event on the AC. The electronic device 106 compares the determined values of the functional capabilities of the AC, the indoor temperature sensor, the humidity sensor, and the CO2 sensor with the respective threshold of values of the functional capabilities stored in the correlation event database 214 for the event of switching ON the AC in the fast cooling mode. The electronic device 106 detects the anomaly in the AC, as the values of the functional capabilities of the indoor temperature sensor, and the CO2 sensor deviate beyond the respective threshold of values. In an example herein, the anomaly may be detected as the AC is not being cooling a defined area within a pre-defined time (i.e., time, which has been defined for the fast cool mode). However, the time may not be significant and other environmental or additional sensor readings may identify anomalies like humidity range, dust particles in air, or the like.

On detecting the anomaly in the AC, the electronic device 106 determines the plurality of possible causes/issues for the anomaly by analyzing at least one of, but is not limited to, the values of the functional capabilities of the AC and the associated co-used devices with respect to the detected event of the AC, the difference/delta between the values of the functional capabilities of the indoor temperature sensor, the humidity sensor, and the CO2 sensor and the respective threshold of values, the information about the anomaly detected in the AC, the anomaly mapping, the historical device health data and so on. In an example herein, the plurality of possible causes for the detected anomaly may be determined as, but are not limited to, AC coolant issue, faulty temperature sensor, window open, less ventilation, CO2 sensor faulty, AC power issue, AC aging issue, and so on. The electronic device 106 performs the collaborative decision analysis on at least one of, but is not limited to, the determined plurality of possible issues/causes, the ambient environment input, the manufacturer provided information, and so on, and determines the causes for the anomaly with the confidence scores. The electronic device 106 may capture the ambient environment input using the one or more sensors deployed in the IoT environment for monitoring the environment of the devices 104. In an example herein, the ambient environment input indicates that a door of a room in which the AC is located is open, an example outside temperature of 35°, a raining condition, a power surge of +/−5 milliampere (mA). The electronic device 106 selects the one or more causes from the determined causes based on the confidence scores, as the causes for the anomaly in the cooktop. In an example herein, the electronic device 106 may determine a coolant issue and a less ventilation may be the root causes for the anomaly detected in the AC. The electronic device 106 derives the emotions that may depict the coolant issue and the less ventilation. The electronic device 106 also determines the remedy like changing the coolant and changing a mode of operating the AC, for resolving the anomaly detected in the AC. The electronic device 106 recommends the remedy with the emotions to the user, so that the user may easily understand that the coolant issue and the less ventilation are the issues for the anomaly detected in the AC and may contact a technician for changing the coolant.

Consider an example scenario, as depicted in FIGS. 14C and 14D, wherein the electronic device 106 manages the health of a cooktop integrated with an oven (an example of the device 104). For managing the health of the cooktop, the electronic device 106 determines the devices 104, such as, but are not limited to, a temperature sensor, a smoke sensor, a fire detection sensor, and so on, as the co-used devices for the cooktop, based on their historical/previous state information (i.e., the state information collected over time). The electronic device 106 analyzes the historical/previous state information (i.e., the state information collected over time) of the cooktop, the temperature sensor, the smoke sensor, and the fire detection sensor and determines the correlation of the one or more events of the cooktop (for example: operating the cooktop a sim mode, operating the cooktop in an automatic mode, or the like) with the threshold of values of the functional capabilities of the cooktop, the temperature sensor, the smoke sensor, and the fire detection sensor. The threshold of values of the functional capabilities of the cooktop, the temperature sensor, the smoke sensor, and the fire detection sensor with respect to each event of the cooktop indicate the allowable values for the corresponding event (beyond which the anomaly may be detected). The electronic device 106 performs the mapping of the threshold of values of the functional capabilities of the cooktop, the temperature sensor, the smoke sensor, and the fire detection sensor with respect to each event of the cooktop and stores the mapping in the correlation event database 214.

The electronic device 106 detects an example event of operating the cooktop in a sim mode. In such a scenario, the electronic device 106 determines the values of the functional capabilities of the cooktop, the temperature sensor, the smoke sensor, and the fire detection sensor (the co-used devices) with respect to the detected event on the cooktop. The electronic device 106 compares the determined values of the functional capabilities of the cooktop, the temperature sensor, the smoke sensor, and the fire detection sensor with the respective threshold of values of the functional capabilities stored in the correlation event database 214 for the event of operating the cooktop in the sim mode. The electronic device 106 detects the anomaly with the cooktop, as the values of the functional capabilities of the smoke sensor deviate beyond the respective threshold of values of the functional capabilities. In an example herein, the anomaly may be referred to presence of smoke surrounding the cooktop. In another example herein, presence of the smoke may not be anomaly, rather volume of smoke per cubic centimeter (cm) signifies that the cooktop is not able to control the temperature (probably inbuilt thermostat issue) and may cause a trigger to smoke and fire alarm though actual fire is not in place. In another example, correlation of other sensors like cooktop temperature sensor, or the like may signify that the chimney is not able to suck out sufficient smoke and cooktop is functioning normally.

On detecting the anomaly with the cooktop, the electronic device 106 determines the plurality of possible causes/issues for the anomaly by analyzing at least one of, but is not limited to, the values of the functional capabilities of the cooktop and the associated co-used devices with respect to the detected event of the cooktop, the difference/delta between the values of the functional capabilities of the smoke sensor and the respective threshold of values, the information about the anomaly detected with the cooktop, the anomaly mapping, the historical device health data and so on. In an example herein, the plurality of possible causes for the detected anomaly may be determined as, but are not limited to, the user has forgot that food is on the cooktop, the oven has heated too much, the food has spilled from a utensil placed on the cooktop, the smoke sensor is faulty, and so on. The electronic device 106 performs the collaborative decision analysis on at least one of, but is not limited to, the determined plurality of possible issues/causes, the ambient environment input, the manufacturer provided information, and so on, and determines the causes for the anomaly with the confidence score. The electronic device 106 may capture the ambient environment input using the one or more sensors deployed in the IoT environment for monitoring the environment of the devices 104. In an example herein, the ambient environment input indicates that a window of the kitchen is open, no food spillage on the cooktop, a power surge of +/−5 milliampere (mA). The electronic device 106 selects the one or more causes from the determined causes based on the confidence scores, as the causes for the anomaly with the cooktop. In an example herein, the electronic device 106 may determine that forgetting by the user that the food is on the cooktop (i.e., usage of the cooktop beyond a pre-defined time) may be the root cause for the anomaly detected with the cooktop. The electronic device 106 derives the emotion that may depict a usage of the cooktop with elapsed time. The electronic device 106 also determines the remedy like turn OFF the cooktop for resolving the anomaly detected with the cooktop. The electronic device 106 recommends the remedy with the emotion to the user, so that the user may easily understand that the user has forgot to turn OFF the cooktop and may turn OFF the cooktop based on the recommended remedy.

Consider an example scenario, as depicted in FIG. 14C and FIG. 14D, wherein the electronic device 106 manages the health of an air purifier (an example of the device 104). For managing the health of the air purifier, the electronic device 106 determines the devices 104, such as, but are not limited to, a UV light sensor, a dust sensor, and so on, as the co-used devices for the air purifier based on their historical/previous state information (i.e., the state information collected over time). The electronic device 106 analyzes the historical/previous state information (i.e., the state information collected over time) of the air purifier, the UV light sensor and the dust sensor and determines the correlation of the one or more events of the air purifier (for example: operating the air purifier in a normal mode, operating the air purifier in a boost mode, or the like) with the threshold of values of the functional capabilities of the air purifier, the UV light sensor and the dust sensor. The threshold of values of the functional capabilities of the air purifier, the UV light sensor and the dust sensor with respect to each event of the air purifier indicate the allowable values for the corresponding event (beyond which the anomaly may be detected). The electronic device 106 performs the mapping of the threshold of values of the functional capabilities of the air purifier, the UV light sensor and the dust sensor with respect to each event of the air purifier and stores the mapping in the correlation event database 214.

The electronic device 106 detects an example event of operating the air purifier in a boost mode. In such a scenario, the electronic device 106 determines the air purifier, the UV light sensor, and the dust sensor (the co-used devices) with respect to the detected event on the air purifier. The electronic device 106 compares the determined values of the functional capabilities of the air purifier, the UV light sensor, and the dust sensor with the respective threshold of values of the functional capabilities stored in the correlation event database 214 for the event of operating the air purifier in the boost mode. The electronic device 106 detects the anomaly in the air purifier, as the values of the functional capabilities of the air purifier, the UV light sensor, and the dust sensor deviate beyond the respective threshold of values of the functional capabilities. In an example herein, the anomaly may be referred to a failure of the air purifier in purifying the air according to criteria pre-defined for the boost mode.

On detecting the anomaly in the air purifier, the electronic device 106 determines the plurality of possible causes/issues for the anomaly by analyzing at least one of, but is not limited to, the values of the functional capabilities of the air purifier and the associated co-used devices with respect to the detected event of the air purifier, the difference/delta between the values of the functional capabilities of the air purifier, the UV light sensor, and the dust sensor and the respective threshold of values, the information about the anomaly detected in the air purifier, the anomaly mapping, the historical device health data and so on. In an example herein, the plurality of possible causes for the detected anomaly may be determined as, but are not limited to, time of year of heavy pollution is nearby, filter is nearly worn out and may break down during bad weather days, and so on. The electronic device 106 performs the collaborative decision analysis on at least one of, but is not limited to, the determined plurality of possible issues/causes, the ambient environment input, the manufacturer provided information, and so on, and determines the causes for the anomaly with the confidence score. The electronic device 106 may capture the ambient environment input using the one or more sensors deployed in the IoT environment for monitoring the environment of the devices 104. In an example herein, the ambient environment input indicates that doors are open, presence of pollen, a condition of raining, 20 gram (gm) per day dust collection, a power surge of +/−5 milliampere (mA), or the like. The electronic device 106 selects the one or more causes from the determined causes based on the confidence scores, as the causes for the anomaly in the air purifier. In an example herein, the electronic device 106 may select that the nearly worn out of the filters of the air purifier may be the root cause for the anomaly detected in the air purifier. The electronic device 106 derives the emotion that may depict the nearly worn out of the filters. The electronic device 106 also determines the remedy like changing the filters within 15 days (for example) for resolving the anomaly detected in the air purifier. The electronic device 106 recommends the remedy with the emotion to the user, so that the user may easily understand that the filters have to be changed for resolving the anomaly detected in the air purifier.

Embodiments herein manage health of devices in an Internet of Things (IoT) environment. Embodiments herein detect at least one anomaly in at least one devices in the IoT environment based on correlation of the one or more events of the at least one device and a change in ambience in the IoT environment, wherein the change in ambience refers to a change in events of co-used devices associated with the at least one device, with respect to the one or more events of the at least one device.

Embodiments herein further determine one or more root causes for the one or more anomalies detected in the at least one device, and derive and recommend one or more remedies for resolving the one or more anomalies detected in the at least one device and one or more emotions for depicting the one or more root causes determined for the one or more anomalies. Thus, recommending the one or more emotions and the one or more remedies for resolving the one or more anomalies in the at least one device to the user may:

enable the user without having knowledge/layman to understand conditions/feeling of the at least one device;
  result in more engaged communications between the devices in the IoT environment;
  enable the at least one device to share the health or heartbeat to other devices for transfer of control in the IoT environment;
  provide a natural way for the user to sense the conditions of the at least one device;

provide a natural way of informing severity of the one or more anomalies to the user/owner of device to get higher attention; and improve brand loyalty for an established emotional connect.

The embodiments disclosed herein can be implemented through at least one software program running on at least one hardware device and performing network management functions to control the elements. The elements shown in FIGS. 1, 2, and 3, can be at least one of a hardware device, or a combination of hardware device and software module.

The embodiments disclosed herein describe methods and systems for managing health of devices in an Internet of Things (IoT) environment. Therefore, it is understood that the scope of the protection is extended to such a program and in addition to a computer readable means having a message therein, such computer readable storage means contain program code means for implementation of one or more steps of the method, when the program runs on a server or mobile device or any suitable programmable device. The method is implemented in a preferred embodiment through or together with a software program written in e.g. Very high speed integrated circuit Hardware Description Language (VHDL) another programming language or implemented by one or more VHDL or several software modules being executed on at least one hardware device. The hardware device can be any kind of portable device that can be programmed. The device may also include means which could be e.g. hardware means like e.g. an ASIC, or a combination of hardware and software means, e.g. an ASIC and an FPGA, or at least one microprocessor and at least one memory with software modules located therein. The method embodiments described herein could be implemented partly in hardware and partly in software. Alternatively, this disclosure may be implemented on different hardware devices, e.g. using a plurality of CPUs.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of embodiments, those skilled in the art will recognize that the embodiments herein can be practiced with modification within the spirit and scope of the embodiments as described herein.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for managing health of a plurality of devices in an Internet of Things (IoT) environment, the method comprising:
    detecting, by an electronic device, an occurrence of at least one event on at least one device of the plurality of devices;
    determining, by the electronic device, a change in an ambience of the at least one device corresponding to the occurrence of the at least one event on the at least one device;
    detecting, by the electronic device, at least one anomaly in the at least one device, if the determined change in the ambience of the at least one device does not satisfy threshold criteria determined for the at least one event; and
    determining, by the electronic device, at least one root cause for the at least one anomaly in the at least one device.

2. The method of claim 1, further comprising:
    deriving and recommending, by the electronic device, at least one emotion for the at least one root cause determined for the at least one anomaly and at least one remedy for resolving the at least one anomaly detected in the at least one device.

3. The method of claim 1, wherein the ambience of the at least one device includes at least one co-used device that operate simultaneously with the at least one device.

4. The method of claim 1, wherein the change in the ambience of the at least one device corresponds to a change in the at least one event of at least one co-used device due to the occurrence of the at least one event on the at least one device.

5. The method of claim 4, wherein the change in the at least one event of the at least one co-used device when operated simultaneously with the at least one device establishes a relationship with the at least one event of the at least one device.

6. The method of claim 1, wherein detecting, by the electronic device, the at least one anomaly in the at least one device comprises:
    receiving state information from the at least one device and an associated at least one co-used device, wherein the state information includes at least one of: device information, event data and associated time stamp data, and manufacturer provided information;
    determining at least one value of at least one functional capability of the at least one device and the associated at least one co-used device corresponding to the at least one event detected on the at least one device, using the received event data of the at least one device and the associated at least one co-used device;
    fetching the threshold criteria determined for the at least one event detected on the at least one device from a correlation event database;
    comparing the determined at least one value of the at least one functional capability of the at least one device and the associated at least one co-used device with the fetched threshold criteria; and
    detecting the at least one anomaly in the at least one device, if one of the at least one value of the at least one functional capability of the at least one device and the associated at least one co-used device is greater than the threshold criteria.

7. The method of claim 6, wherein the threshold criteria include a correlation of a threshold of at least one value of the at least one functional capability of the at least one device and the associated at least one co-used device with respect to each event of a plurality of events of the at least one device.

8. The method of claim 7, wherein determining the threshold criteria for each event of the at least one device comprises:
    collecting over time, by the electronic device, the state information from the at least one device and other devices present in the IoT environment;
    determining, by the electronic device, the associated at least one co-used device from the other devices for the at least one device, using the state information from each device of the at least one device collected over the time;

determining, by the electronic device, the at least one value of the functional capability of the at least one device and the associated at least one co-used device for each of the plurality of events of the at least one device using the state information collected over the time of the at least one device and the associated at least one co-used device;

performing, by the electronic device, a statistical correlation analysis on the determined at least one value of the functional capability of the at least one device and the associated at least one co-used device to identify at least one highly correlated functional capability among the at least one functional capability of the at least one device and the associated at least one co-used device for each event of the at least one device; and analyzing, by the electronic device, the at least one highly correlated functional capability and manufacturer defined at least one threshold limit value of the at least one functional capability of the at least one device and the associated at least one co-used device to determine the correlation of the threshold of at least one value of the at least one functional capability of the at least one device and the associated at least one co-used device with respect to each event of the plurality of events of the at least one device.

9. The method of claim 8, wherein determining, by the electronic device, the associated at least one co-used device for the at least one device comprises:

determining the at least one event and associated time data of the at least one device and the other devices from the state information received from each device;

dividing the at least one event of the at least one device and the other devices into at least one timeslot;

generating at least one transaction data by grouping the at least one event associated with the at least one timeslot, wherein each transaction includes the at least one event, the at least one device and at least one other device associated with the at least one event; and determining the associated at least one co-used device from the other devices for the at least one device, by analyzing the at least one transaction data using a pattern mining method.

10. The method of claim 8, wherein a linear regression with gradient descent method is used to determine the correlation of the threshold of at least one value of the at least one functional capability of the at least one device and the associated at least one co-used device with respect to each event of the plurality of events of the at least one device.

11. The method of claim 8, further comprising:

performing, by the electronic device, a mapping of the threshold of at least one value of the at least one functional capability of the at least one device and the associated at least one co-used device with respect to each event of the plurality of events of the at least one device; and storing, by the electronic device, the performed mapping as the threshold criteria in the correlation event database for each event of the plurality of events of the at least one device.

12. The method of claim 1, wherein determining, by the electronic device, the at least one root cause for the at least one anomaly in the at least one device comprises:

determining a plurality of causes for the at least one anomaly detected in the at least one device, by analyzing at least one of: at least one value of at least one functional capability of the at least one device and an associated co-used device determined for the at least one event of the at least one device and a respective threshold of at least one value of the at least one functional capability, historical device health data, an anomaly mapping, and the at least one anomaly;

detecting at least one ambient environment input by receiving and processing data from at least one sensor present in the IoT environment for monitoring a surrounding environment of the at least one device;

determining a confidence score for each of the determined plurality of causes, by performing a collaborative decision analysis on at least one of: the determined plurality of causes, the detected at least one ambient environment input, and manufacturer provided issue information; and selecting at least one cause with a highest confidence score, compared to other causes of the plurality of causes, as the at least one root cause for the at least one anomaly detected in the at least one device.

13. The method of claim 12, wherein:

the anomaly mapping, the historical device health data, and the manufacturer provided issue information are fetched by the electronic device from a device health knowledge database; and the anomaly mapping includes a list of anomalies mapped with the at least one value of the at least one functional capability of the at least one device and the associated co-used device and the at least one cause.

14. The method of claim 2, wherein deriving, by the electronic device, the at least one emotion and the at least one remedy comprises:

fetching a mapping of a list of emotions and remedies with each of the plurality of causes of the at least one anomaly from an emotion health mapper database; and deriving the at least one emotion and the at least one remedy for at least one cause determined for the at least one anomaly using the mapping, wherein the at least one emotion illustrates the at least one root cause of the at least one anomaly and the at least one remedy includes information about at least one action to be performed for resolving the at least one anomaly detected in the at least one device.

15. The method of claim 14, further comprising:

performing, by the electronic device, a continuous polling to check the at least one remedy used to resolve the at least one anomaly detected in the at least one device; and considering, by the electronic device, the at least one remedy used to resolve the at least one anomaly detected in the at least one device as a feedback to detect at least one subsequent anomaly in the at least one device.

16. A method for managing health of devices in an Internet of Things (IoT) environment, the method comprising:

monitoring over time, by an electronic device, a plurality of operational modes of at least one IoT device for health management;

monitoring, by the electronic device, changes in an ambience as a result of each operational mode of the at least one IoT device, using one or more ambient sensors located within premises of the IoT environment;

generating, by the electronic device, a correlation event database including a correlation of each operational mode of the at least one IoT device against the changes in the ambience, wherein the correlation indicates a threshold of readings of the one or more ambient sensors for each operational mode of the at least one IoT device;

comparing, by the electronic device, current readings of the one or more ambient sensors with the correlation present in the correlation event database;

detecting, by the electronic device, a health anomaly in the at least one IoT device, in response to a result of the comparison indicating a deviation beyond the threshold of readings;

analyzing, by the electronic device, the detected health anomaly in relation to a device health knowledge database to estimate at least one root cause for the detected health anomaly; and providing, by the electronic device, a recommendation of the at least one root cause for managing the at least one IoT device.

17. An electronic device in an Internet of Things (IoT) environment comprising:
 a memory; and
 a processor coupled to the memory and configured to:
  detect an occurrence of at least one event on at least one device of a plurality of devices,
  determine a change in an ambience of the at least one device corresponding to the occurrence of the at least one event on the at least one device,
  detect at least one anomaly in the at least one device, if the determined change in the ambience of the at least one device does not satisfy threshold criteria determined for the detected at least one event, and
  determine at least one root cause for the detected at least one anomaly in the at least one device.

18. The electronic device of claim 17, wherein the processor is further configured to:
 derive and recommend at least one emotion for the at least one root cause determined for the at least one anomaly and at least one remedy for resolving the at least one anomaly detected in the at least one device.

19. The electronic device of claim 17, wherein the ambience of the at least one device includes at least one co-used device that operate simultaneously with the at least one device.

20. The electronic device of claim 17, wherein the change in the ambience of the at least one device corresponds to a change in the at least one event of at least one co-used device due to the occurrence of the at least one event on the at least one device.

* * * * *